US008701351B2

(12) United States Patent
Siegel

(10) Patent No.: US 8,701,351 B2
(45) Date of Patent: Apr. 22, 2014

(54) FLEXIBLE SEAL FOR RECREATIONAL VEHICLES

(71) Applicant: Kenneth Siegel, Buena Park, CA (US)

(72) Inventor: Kenneth Siegel, Buena Park, CA (US)

(73) Assignee: Trim-Lok, Inc., Buena Park, CA (US)

( * ) Notice: Subject to any disclaimer, the term of this patent is extended or adjusted under 35 U.S.C. 154(b) by 0 days.

(21) Appl. No.: 13/975,198

(22) Filed: Aug. 23, 2013

(65) Prior Publication Data

US 2014/0001710 A1 Jan. 2, 2014

Related U.S. Application Data

(63) Continuation-in-part of application No. 13/861,885, filed on Apr. 12, 2013.

(60) Provisional application No. 61/624,137, filed on Apr. 13, 2012.

(51) Int. Cl.
*E06B 7/16* (2006.01)
*F16J 15/02* (2006.01)

(52) U.S. Cl.
USPC ......... 49/490.1; 49/475.1; 277/649; 277/921; 52/2.14

(58) Field of Classification Search
USPC ............... 49/91.1, 355, 475.1, 466, 490.1; 52/2.14; 277/649, 921
See application file for complete search history.

(56) References Cited

U.S. PATENT DOCUMENTS

| | | | |
|---|---|---|---|
| 2,744,781 A | | 5/1956 | Black et al. |
| 3,242,531 A | | 3/1966 | Nohl et al. |
| 3,242,537 A | | 3/1966 | Monti |
| 3,400,964 A | | 9/1968 | Baermann et al. |
| 3,411,243 A | | 11/1968 | Baermann et al. |
| 3,719,386 A | | 3/1973 | Puckett et al. |
| 4,277,919 A | | 7/1981 | Artweger et al. |
| 4,361,348 A | | 11/1982 | Rapp et al. |
| 4,395,939 A | | 8/1983 | Hough et al. |
| 4,448,430 A | | 5/1984 | Bright |
| 4,549,761 A | | 10/1985 | Lee et al. |
| 4,916,864 A | * | 4/1990 | Thompson ............... 49/478.1 |
| 4,955,661 A | | 9/1990 | Mattice |
| 5,193,310 A | * | 3/1993 | Kiel .......................... 49/501 |

(Continued)

FOREIGN PATENT DOCUMENTS

| | | |
|---|---|---|
| DE | 1055976 | 4/1959 |
| DE | 9300312 | 4/1993 |

(Continued)

*Primary Examiner* — Vishal Patel
(74) *Attorney, Agent, or Firm* — Cislo & Thomas, LLP

(57) ABSTRACT

A seal assembly located at the intersection of an extension room and wall of a recreation vehicle, the seal assembly having a flap seal, a bulb snap-in member attached to the flap seal, and a bulb seal member attachable to the bulb snap-in member in a snap-fit manner. The bulb seal member may be attached to the bulb snap-in member by a living hinge. The flap seal may be made removable from the bulb snap-in member. Two flap seals may be used to attach to either side of the recreation vehicle wall. The two flap seals may be connectable with each other and adjustable via a longitudinal mating shaft on one flap seal and a longitudinal mating shaft receiving member on the second flap seal. The seal assembly may be manufactured by a multi-extrusion process so that various components can be made of different materials, such as different types of plastic.

17 Claims, 13 Drawing Sheets

(56) References Cited

U.S. PATENT DOCUMENTS

| | | |
|---|---|---|
| 5,237,782 A | 8/1993 | Cooper |
| 5,408,784 A | 4/1995 | Wruck et al. |
| 5,785,373 A | 7/1998 | Futrell et al. |
| 5,788,306 A | 8/1998 | DiBiagio et al. |
| 5,791,715 A | 8/1998 | Nebel |
| 5,894,698 A | 4/1999 | Dewald, Jr. et al. |
| 6,007,142 A | 12/1999 | Gehmann et al. |
| 6,048,016 A | 4/2000 | Futrell et al. |
| 6,094,870 A | 8/2000 | Stacy |
| 6,108,983 A | 8/2000 | Dewald et al. |
| 6,152,516 A | 11/2000 | Williams |
| 6,176,045 B1 | 1/2001 | McManus et al. |
| 6,224,126 B1 | 5/2001 | Martin et al. |
| 6,401,398 B1 | 6/2002 | Panayides et al. |
| 6,428,073 B1 | 8/2002 | Blodgett, Jr. |
| 6,527,324 B2 | 3/2003 | McManus et al. |
| 6,572,170 B2 | 6/2003 | McManus et al. |
| 6,598,354 B2 | 7/2003 | McManus et al. |
| 6,619,726 B2 | 9/2003 | Jones |
| 6,735,909 B1 | 5/2004 | Gardner |
| 6,840,568 B2 | 1/2005 | Carrillo et al. |
| 6,942,225 B2 | 9/2005 | Gentemann et al. |
| 6,966,590 B1 | 11/2005 | Ksiezopolki et al. |
| 7,380,854 B1 | 6/2008 | Hanser et al. |
| 7,540,116 B1 | 6/2009 | Martinson |
| 7,614,676 B2 | 11/2009 | Ksiezopolski et al. |
| 7,614,677 B2 * | 11/2009 | Ksiezopolski et al. .... 296/26.09 |
| 7,743,814 B2 * | 6/2010 | Woodward et al. ............ 160/40 |
| 8,240,744 B2 | 8/2012 | Schwindaman et al. |
| 8,366,168 B1 | 2/2013 | Ksiezopolski et al. |
| 8,382,124 B2 | 2/2013 | Ksiezopolski et al. |
| 8,408,625 B1 | 4/2013 | Ksiezopolski et al. |
| 2002/0078634 A1 | 6/2002 | McManus et al. |
| 2002/0089213 A1 | 7/2002 | Gehman et al. |
| 2006/0091687 A1 | 5/2006 | Schoffner et al. |
| 2006/0117673 A1 | 6/2006 | McManus et al. |
| 2008/0116707 A1 * | 5/2008 | Boaz et al. ................ 296/26.01 |
| 2008/0265618 A1 | 10/2008 | Cadena et al. |

FOREIGN PATENT DOCUMENTS

| | | |
|---|---|---|
| DE | 19912176 | 9/2000 |
| GB | 2001589 | 1/1982 |
| WO | WO 99/33683 | 7/1999 |
| WO | WO 02/30705 | 4/2002 |

* cited by examiner

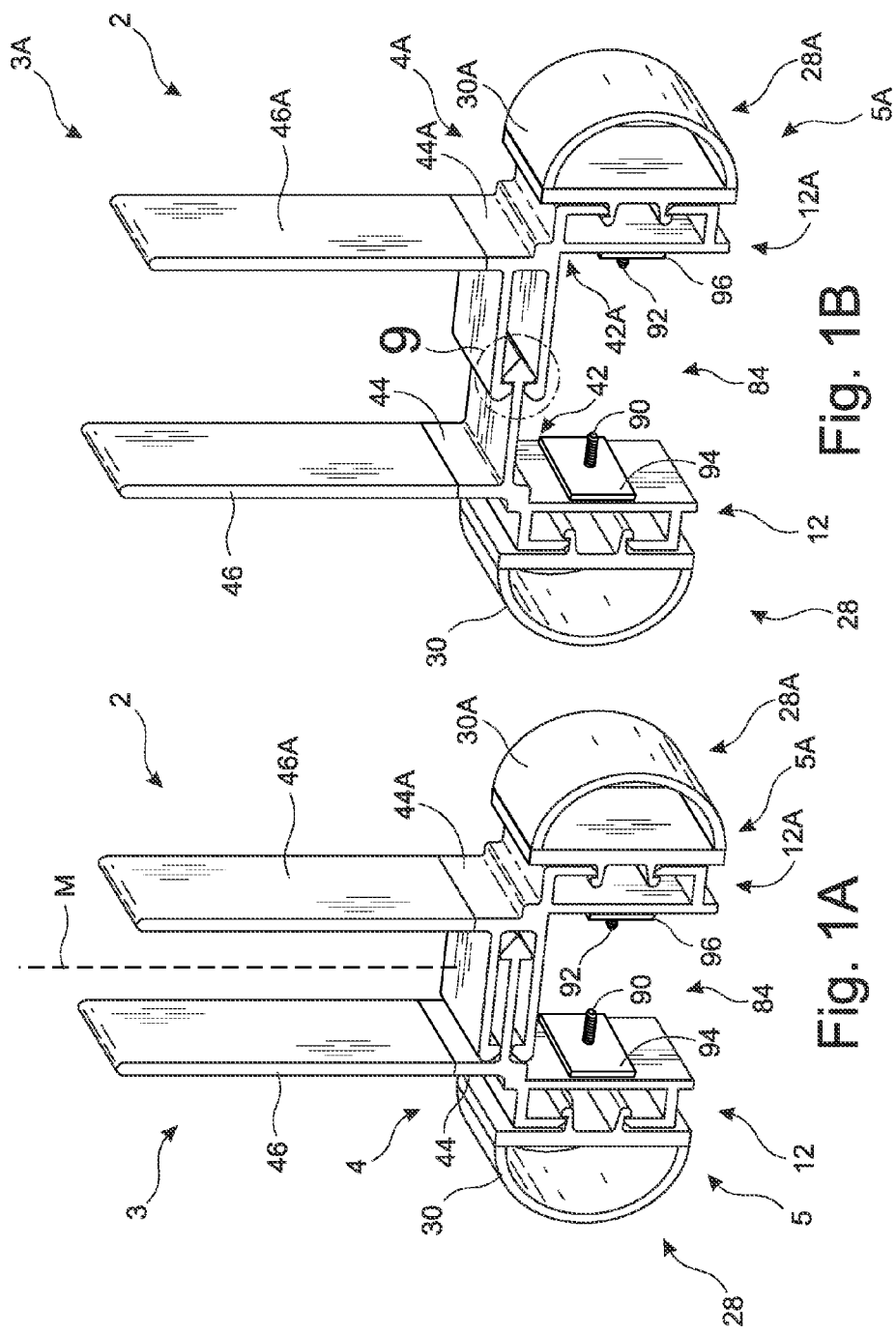

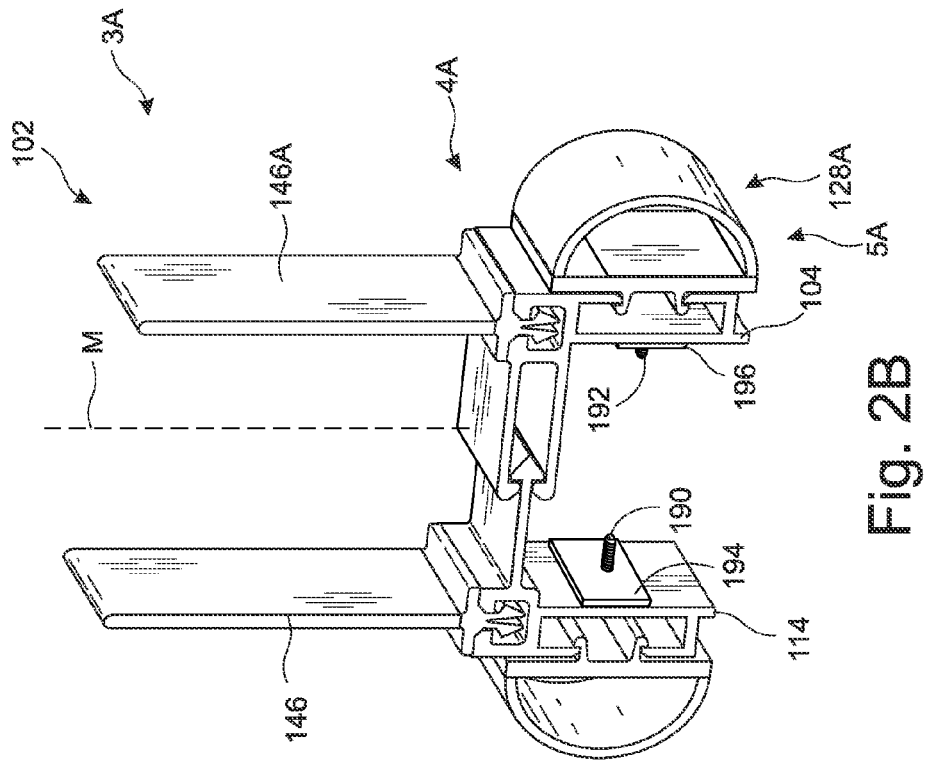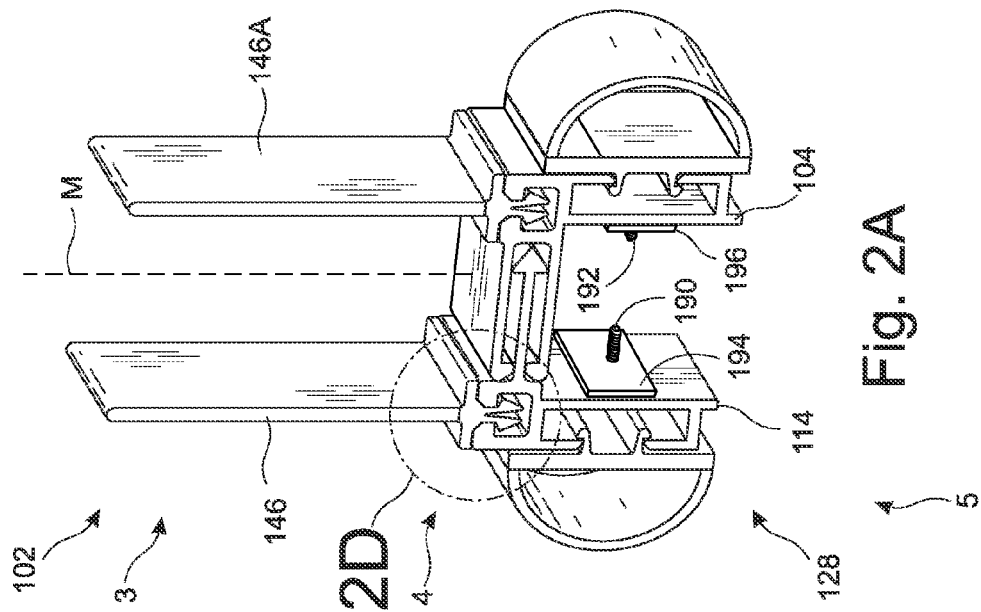

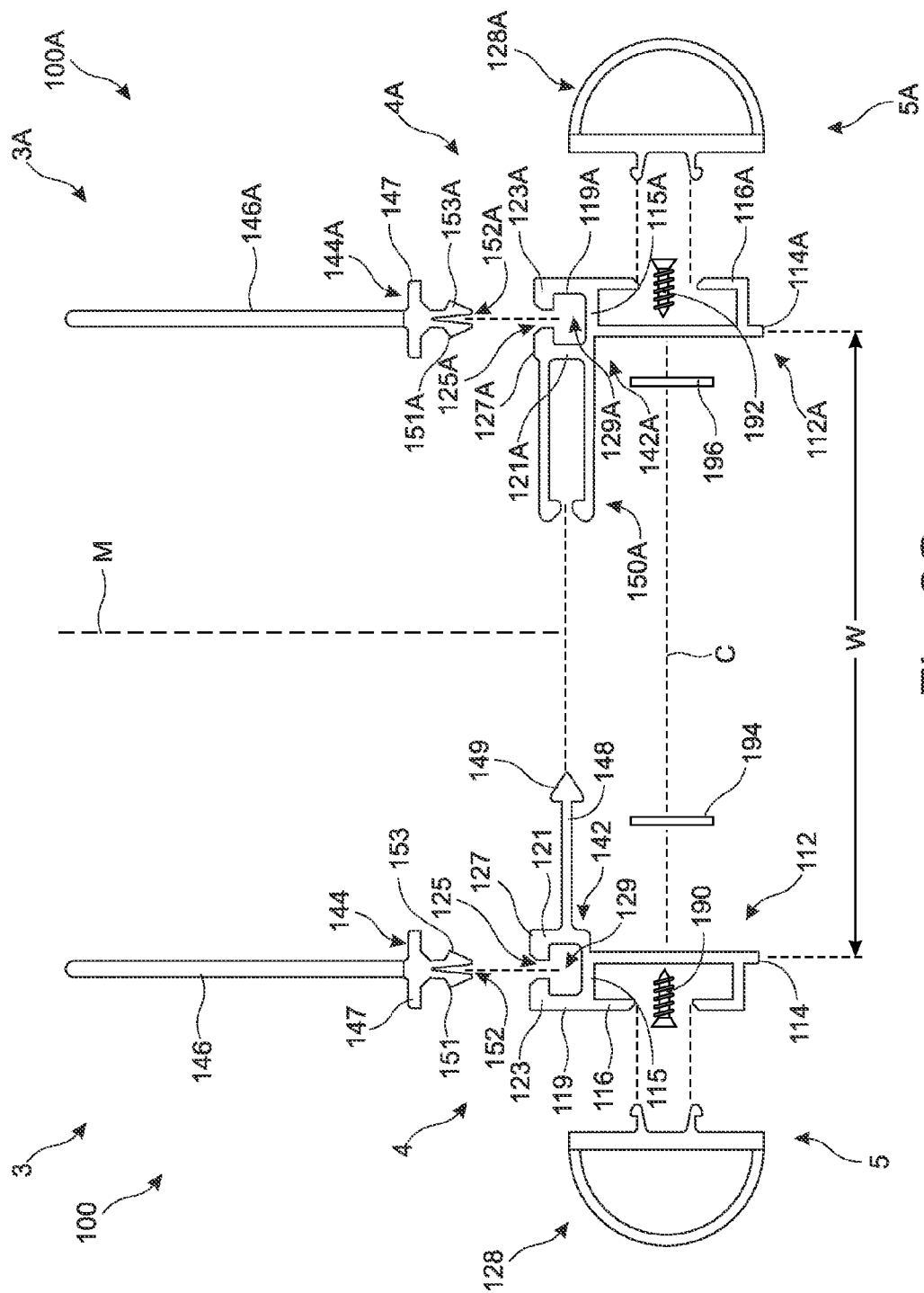

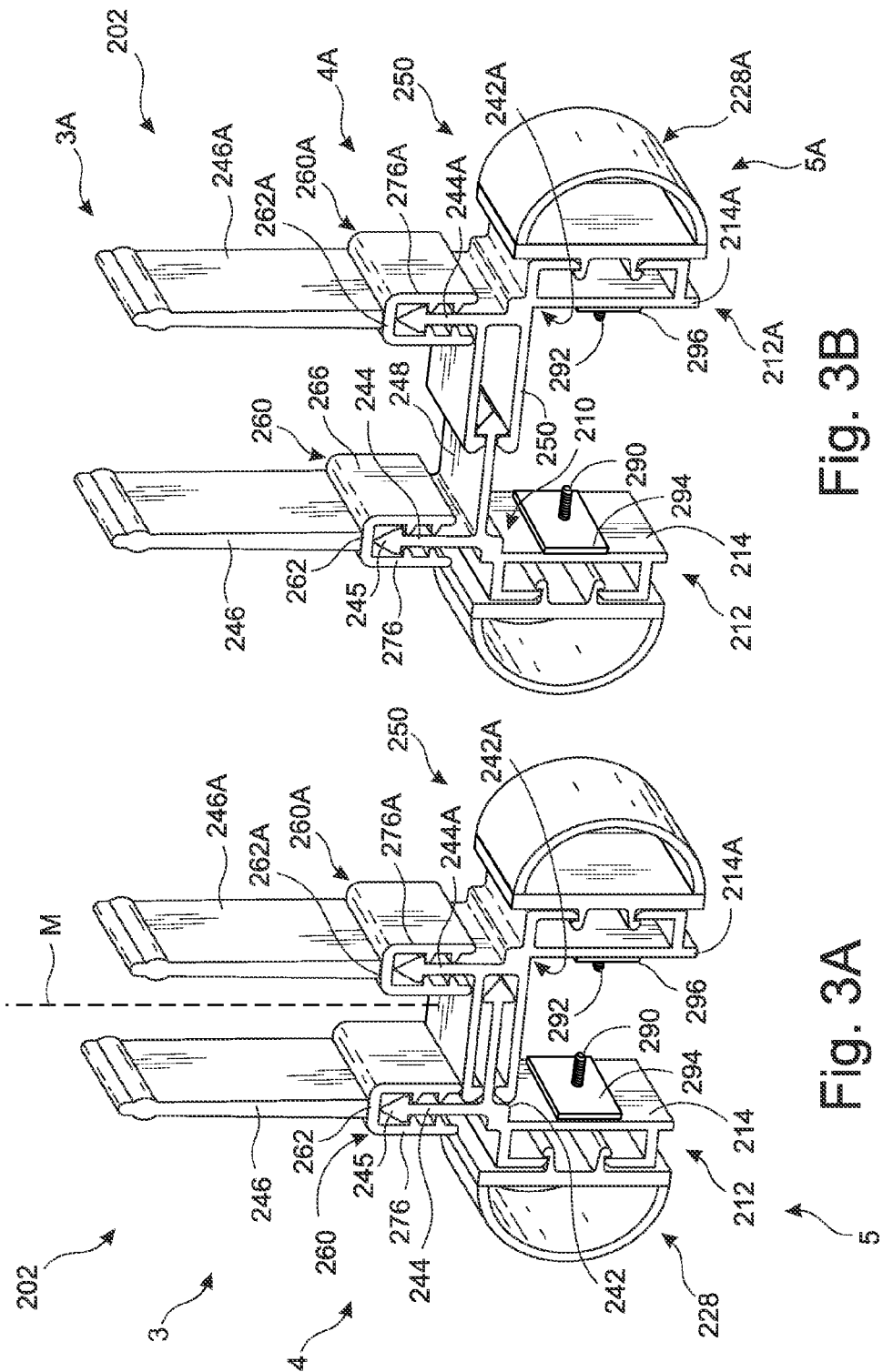

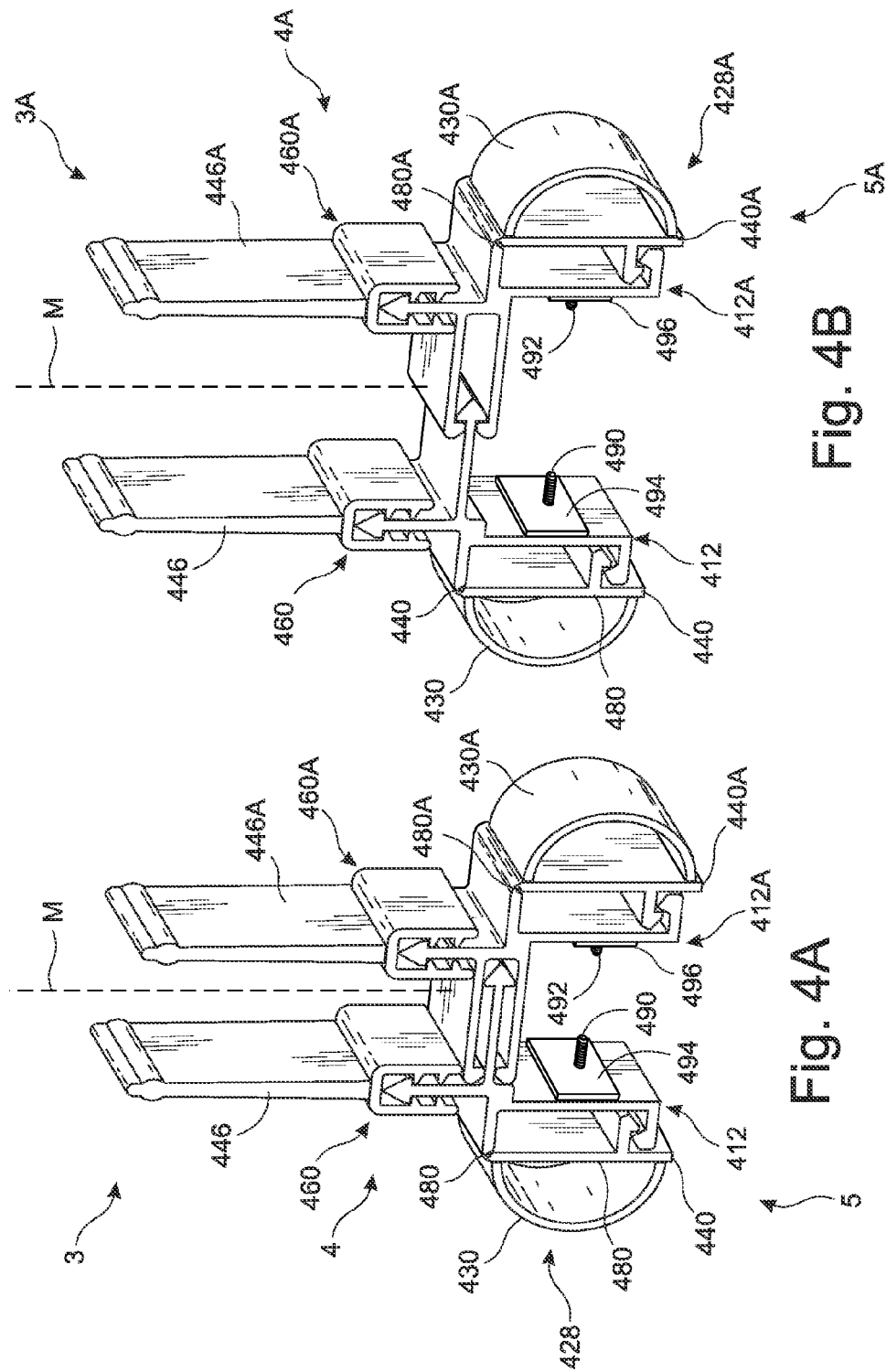

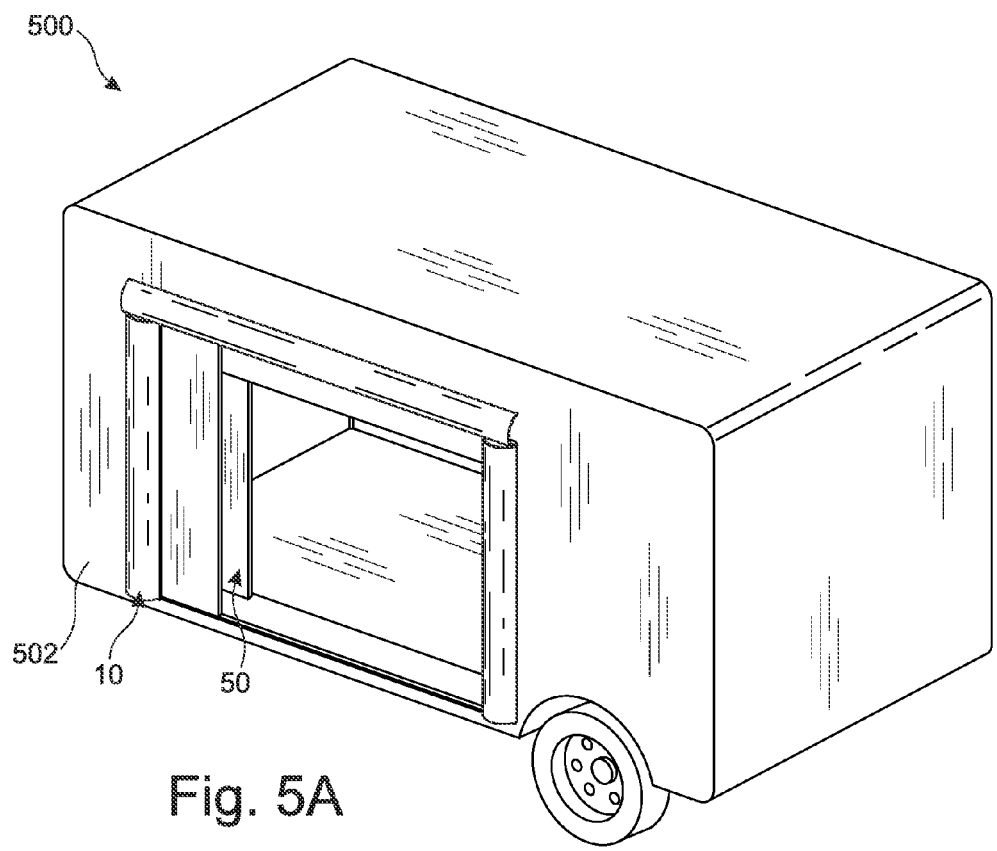
Fig. 5A
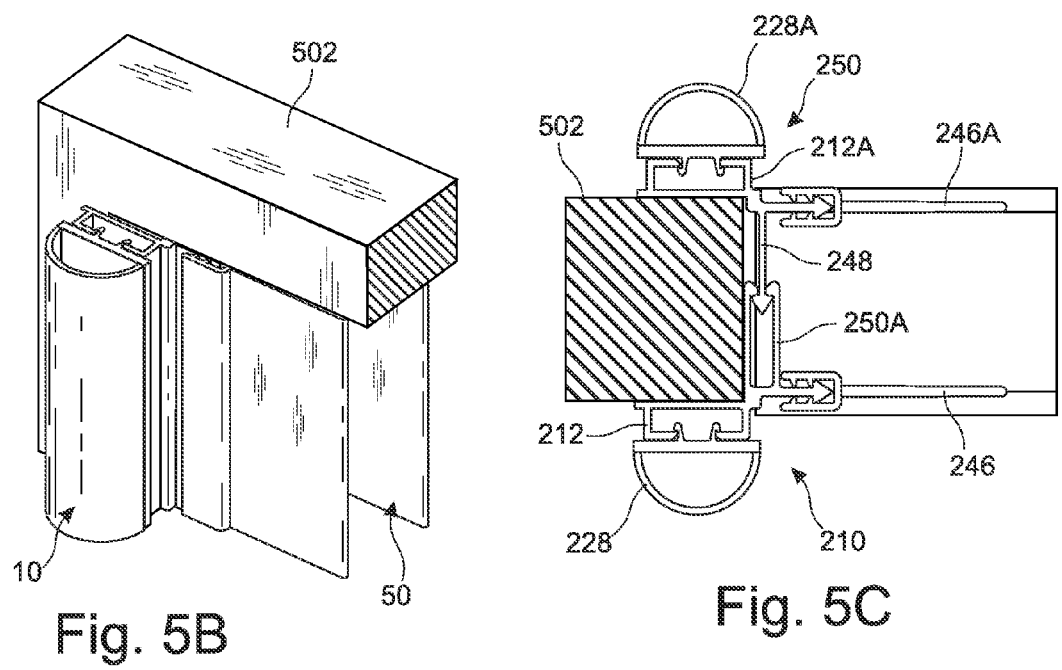
Fig. 5B
Fig. 5C

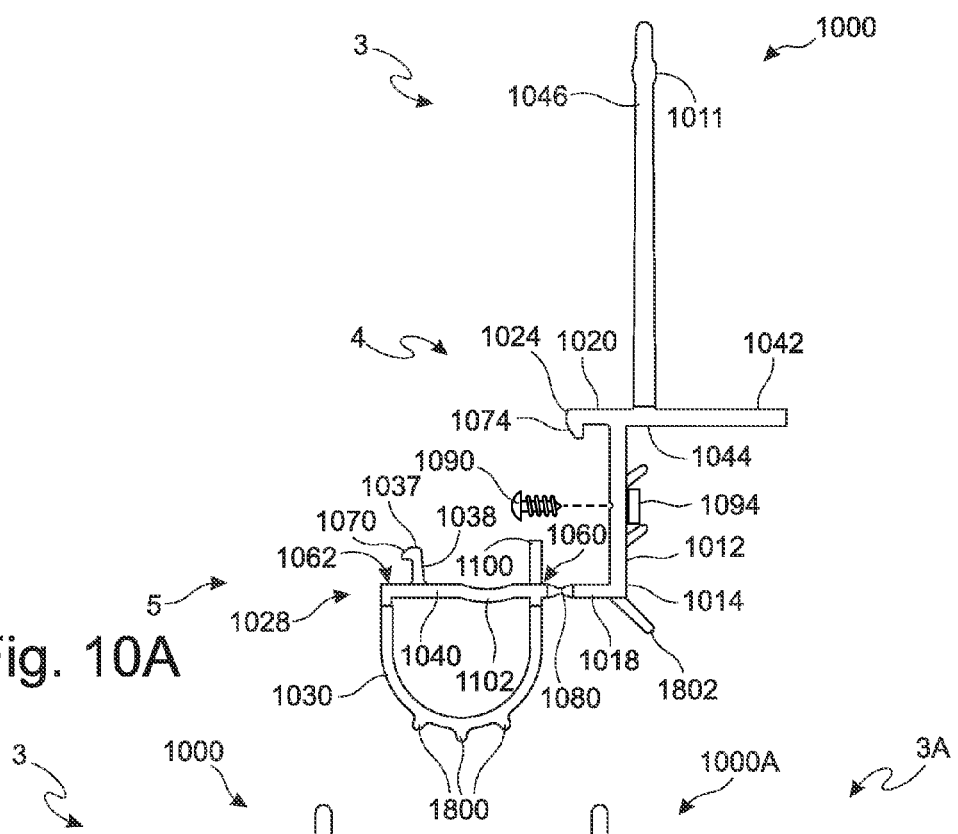
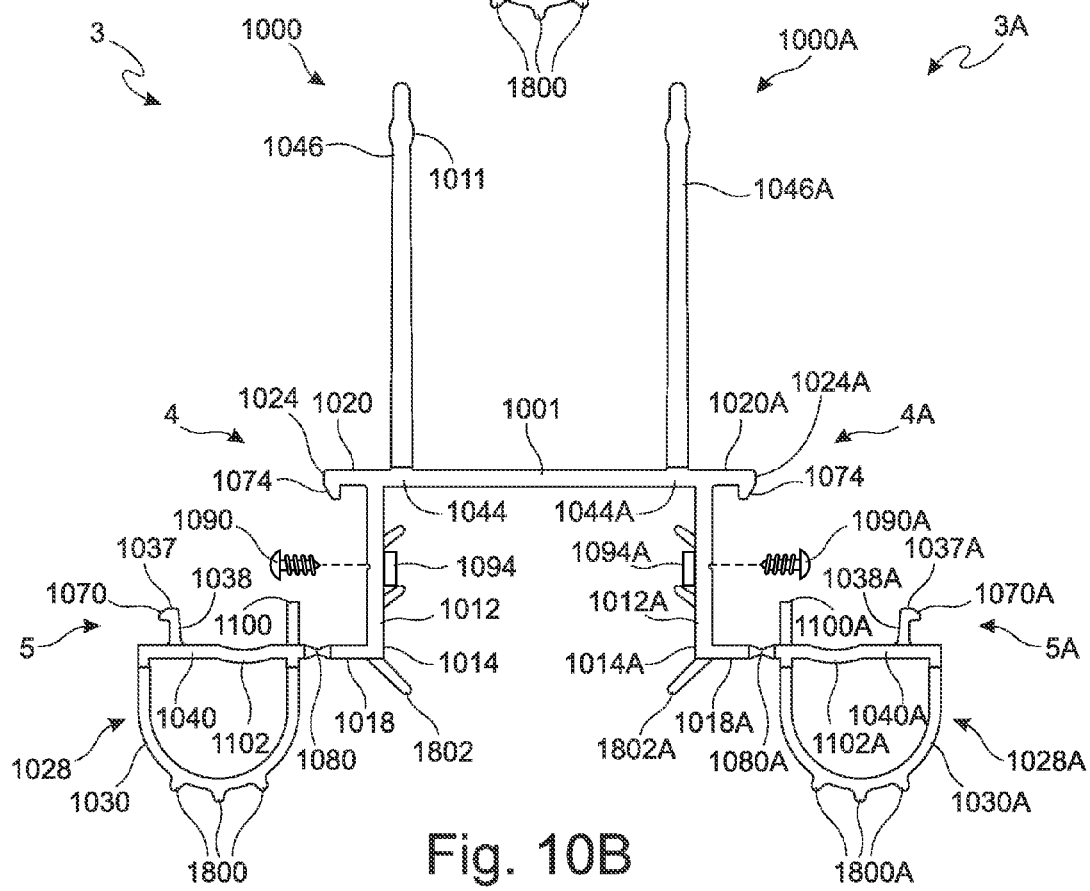

FLEXIBLE SEAL FOR RECREATIONAL VEHICLES

CROSS-REFERENCE TO RELATED APPLICATION

This patent application is a continuation-in-part of U.S. patent application Ser. No. 13/861,885, filed Apr. 12, 2013, entitled "Flexible Seal for Recreational Vehicles," which claims the benefit of U.S. Provisional Patent Application No. 61/624,137, filed on Apr. 13, 2012, entitled "Flexible Seal Located at the Intersection of an Extension Room and Body of a Recreational Vehicle, the Flexible Seal Being Adjustable and Having a Plastic Base Cap and a Removable Bulb Seal and a Separate Flap Seal," which applications are incorporated in their entirety here by this reference.

TECHNICAL FIELD

The present invention relates to the field of seals located at the intersection of an extension room, pop-out room, slide-out room, etc., and the body of a recreational vehicle, including campers or trailers. The present invention also relates to the sub-field of affixing the seal onto the walls of a recreational vehicle as opposed to the walls of the extension room.

BACKGROUND

Sealing slide-out rooms is a major challenge, especially when they are in the extended position. If the recreational vehicle (RV), such as a motor home, fifth wheel, travel trailer, and the like, with the slide-out room is cleaned by spray washing, in all likelihood water will get inside. Achieving a watertight seal around the entire slide-out may be one of the most challenging aspects in sealing today's slide-out rooms.

In reality, the areas around the slide-out room can be the most open area of the RV. Water, light, varmints, insects, etc. can get inside the RV if not properly sealed. Every RV owner who has slide-out rooms should be aware of these issues.

Various solutions have been proposed, including alternative solutions created by the present inventor. There is a significant need for a solution which addresses these problems and also provides maximum flexibility and options to the recreational vehicle manufacturer.

SUMMARY

The present invention is seal assembly made of a multi-part, multi-material, flexible molded and/or extruded ethylene propylene diene monomer rubber (EPDM), neoprene, silicon, rubber, plastic, or other flexible material. It also comprises several variations. By way of example only, all variations include a detachable or partially detachable bulb seal formed of any type of plastic material, such as flexible Thermoplastic Elastomer (TPE), out of which a bulb seal portion and a flap seal portion may be formed, and a base and flexible locking member made of a more rigid material, such as Thermoplastic Olefin (TPO). Some variations also include an adjustment means to enable the multi-part seal to vary its width to affix to the interior and exterior of various RV walls having different thicknesses. The alternative variations include a fixed pair of flap seals formed as an integral piece with its retention members or a removable pair of flap seals including several alternative embodiments for the removable pair of flap seals.

The first preferred embodiment of the present invention is a combination two-section seal, each section comprised of two separate parts. The first section includes a first bulb snap-in member having a plastic extruded slot, side and an oppositely disposed plastic extruded dart side having transverse walls separating the slot side and the dart side, with the dart side having a pair of oppositely disposed walls with an opening to receive the flexible cantilever snap members from a first removable bulb seal member. The slot side extends to a first offset portion which extends in a direction which is the same as the wall of the slot, side to a flap seal retaining member which permanently retains and is integrally formed with a first fixed flap seal. The first offset portion also includes a perpendicular longitudinal mating shaft terminating in an arrow tip at its distal end. The first bulb seal portion includes a first plastic extruded base member having a pair of spring engaging cantilever snap members extending away from the plastic extruded base member, each cantilever snap member terminating in a transverse barrier section. A first flexible bulb seal is affixed to an opposite lengthwise wall of the base member. The cantilever snap members are flexibly pushed through the opening in the dart side so that a respective cantilever snap member is press fit retained against a respective dart sidewall adjacent the dart side opening.

The second section is primarily a mirror image of the first section except for a shaft receiving member to facilitate adjusting the width between the two respective slot sidewalls. The second section includes a second bulb snap-in member having a plastic extruded slot side and an oppositely disposed plastic extruded dart side having transverse walls separating the slot side and the dart side with the dart side having a pair of oppositely disposed walls with an opening to receive the flexible cantilever snap members from a second removable bulb seal member. The slot side extends to a second offset portion which extends in a direction which is the same as the slot wall side to a flap seal retaining member which is integrally formed (coextruded, tri-extruded, multi-extruded, etc.) with a second fixed flap seal. The second offset portion also includes a perpendicular longitudinal mating shaft receiving member having a pair of parallel spaced apart longitudinal walls surrounding an interior longitudinal opening, each longitudinal wall terminating in an interior tooth member extending into the opening. The second bulb seal portion includes a second plastic extruded base member having a pair of cantilever snap members extending away from the plastic extruded base member, each cantilever snap member terminating in a transverse barrier section. A second flexible bulb seal is affixed to an opposite lengthwise wall of the base member. The cantilever snap members are flexibly pushed through the opening in the dart side so that a respective cantilever snap member is press fit retained against a respective dart sidewall adjacent the dart side opening.

The first and second sections are positioned so that they face each other with the slot side of the first section parallel to and facing the slot, side of the second section and the respective bulb sections facing away from each other. The longitudinal mating shaft of the first section is inserted into the opening in the longitudinal mating shaft receiving member of the second section so that the arrow tip is retained by the teeth of the walls and the shaft is slidably received within the longitudinal opening. As a result, the distance or width of the opening between the oppositely disposed slot sidewalls can be adjusted to accommodate the width of the wall section of the recreational vehicle to which the bulb and flap seal assembly are affixed. The pair of flap seals extends parallel to each other.

The bulb seal may come attached to the flap seal or disassembled. To affix the assembly to the wall of a recreational vehicle, the respective bulbs are removed (if previously attached) and a fastening means such as one or more threaded screws are pushed through the openings in the dart walls and respectively screwed through the respective slot sidewall and into the wall of the recreational vehicle. Alternatively, staples are used as the fastening member. The distance between the slot sidewalls can be adjusted to match the thickness of the wall location so that there is a tight fit engagement between the two slot sidewalls and opposite sides of the exterior walls of the vehicle at the location where the expansion room moves in and out. The flap seal extends into the open space in the recreational vehicle through which the expansion room slideably moves. The first flap seal is adjacent the outside of the recreational vehicle wall and the second flap seal is adjacent the sidewall of the recreational vehicle wall. Once the flap seals are secured to the wall, the bulb seals are snapped into place into their respective bulb snap-in members. When the expansion room is in the fully expanded condition, the second flap seal and bulb seal provide the sealing function. When the expansion room is in the fully retracted position, the first flap seal and bulb seal provide the sealing function. The first bulb seal is adjacent the outside of the recreational vehicle wall and the second bulb seal is adjacent the inside of the recreational vehicle wall.

The first alternative embodiment of the present invention is identical to the first preferred embodiment with the only difference being that the flap seals are removably affixed to the offset portions of the first and second sections so that the flap seals can be replaced if they are damaged without the necessity of having to replace the entire unit. The slot side extends to a first offset portion which extends in the same direction as the slot wall side but instead of terminating in a rigid flap seal receiving member, it terminates in a transverse wall which has a pair of oppositely disposed parallel sidewalls, one of which is aligned with a dart sidewall and the opposite wall spaced apart from and parallel to it, the walls having distal transverse walls extending toward each other and having an opening separating the transverse wall and leading to a chamber surrounded by the transverse wall and the parallel walls. The flap seal is supported by a base having a flap seal receiving opening on one side and a pair of hooked spring teeth extending from its opposite side. The spring teeth are forced through the opening of the pair of transverse walls and retained in the chamber. A press fit of the spring teeth against the interior of the transverse walls assures a tight fit within the chamber. In some embodiments, the spring teeth may be replaced with a T-shaped base. A strong pulling force to overcome the spring fit is necessary to remove the spring teeth and replace the flap seal. In this first alternative design, the perpendicular longitudinal mating shaft terminating in an arrow tip extends from the parallel sidewall not in line with the dart sidewall of the first section. In the opposite section the perpendicular mating shaft receiving member extends from the parallel sidewall not in line with the dart sidewall of the second section. The assembly functions the same way as the first preferred embodiment.

The second alternative embodiment of the present invention is comparable to the first alternative embodiment where the flap seals are removably affixed to the offset portions of the first and second sections so that the flap seals can be replaced if they are damaged without the necessity of having to replace the entire unit. The slot side extends to a first offset portion which extends in the same direction as the slot wall side and extends to a shaft section terminating in an arrow tip. The flap seal is embedded in a housing having a transverse wall and a pair of sidewalls extend therefrom to create an interior cavity and a multiplicity of inwardly extending teeth extending into the cavity from the sidewalls. The arrow tip shaft is retained in the cavity with the arrow press fit retained by the teeth. A strong force is necessary to overcome the retention force to remove and replace the flap seal. In this second alternative design, the perpendicular longitudinal mating shaft terminating in an arrow tip is retained and configured in the same way as the first preferred embodiment and so is the mating shaft receiving member. The assembly functions the same way as the first preferred embodiment.

In other embodiments of the present invention, any of the previous embodiments can be modified so that the bulb seal is affixed to the bulb snap-in member with a living hinge so that the bulb seal is perfectly aligned with the bulb snap-in member, allowing the bulb seal to snap into place without the need for any adjustment or alignment.

In other embodiments, any of the previous embodiment can be modified to eliminate the longitudinal mating shaft and the mating shaft receiving member. In this case, a single section may be fastened to one side of the wall. Alternatively, if a double seal is preferred, two identical single sections can be placed on opposite sides of the RV without any overlap.

In some embodiments, any of the previous embodiments can be modified so that two sections are connected at a fixed distance by a bridge.

It is an object of the present invention to provide a pair of flap seals and bulb seals which are retained and separated by a mechanism which enables the seal retaining mechanism to be adjusted to be tightly fit against the interior and exterior wall of the recreational vehicle at a location where an expansion room slides in and out of the recreational vehicle. In some embodiments, the bulb seals may be fixed but are removable and replaceable. The flap seals can either be integrally formed and therefore fixed and non-removable, or removably affixed and replaceable if damaged.

Optional features in all embodiments are waterproof seals affixed to the respective flap sides. The seals are optional and either both or one seal can be used. The primary purpose is to be used as a waterproofing seal for the RV outer wall. The seals can also be used either in addition to screws or staples or in place of screws or staples to fasten a flap side to a recreational vehicle sidewall with adhesive on the seal.

Further novel features and other objects of the present invention will become apparent from the following detailed description, discussion and the appended claims, taken in conjunction with the drawings.

BRIEF DESCRIPTION OF DRAWINGS

FIG. 1A is a perspective view of an embodiment of the present invention in a first configuration.

FIG. 1B is a perspective view of the embodiment shown in FIG. 1A, but in a second configuration.

FIG. 2A is a perspective view of another embodiment of the present invention in a first configuration.

FIG. 2B is a perspective view of the embodiment shown in FIG. 2A, but in a second configuration.

FIG. 2C is an exploded view of the embodiment shown in FIGS. 2A and 2B.

FIG. 3A is a perspective view of another embodiment of the present invention in a first configuration.

FIG. 3B is a perspective view of the embodiment shown in FIG. 3A, but in a second configuration.

FIG. 4A is a perspective view of another embodiment of the present invention in a first configuration.

FIG. 4B is a perspective view of the embodiment shown in FIG. 4A, but in a second configuration.

FIG. 5A shows a perspective view of an embodiment of the seal assembly of the present invention installed on a recreation vehicle (not drawn to scale).

FIG. 5B shows a partial view of an embodiment of the seal assembly installed on a wall of a recreation vehicle.

FIG. 5C shows a top view of an embodiment of the present invention installed on a recreational vehicle.

FIG. 10A shows another embodiment of the present invention.

FIG. 10B shows a variation of the embodiment shown in FIG. 10A with a dual flap seal.

DETAILED DESCRIPTION OF THE INVENTION

Figure 1C:
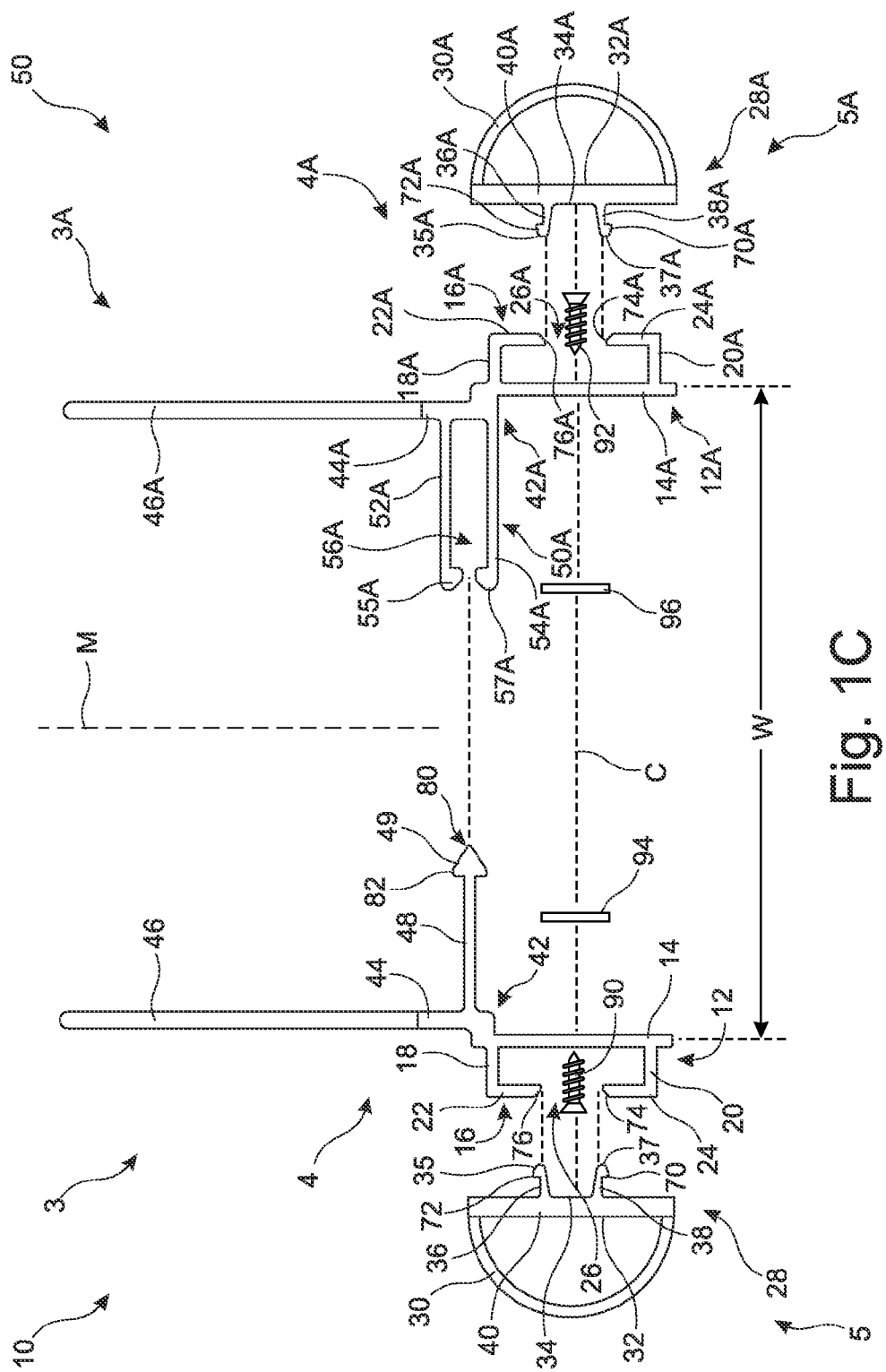
FIG. 1C is an exploded view of the embodiment shown in FIGS. 1A and 1B.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that, are also intended to be encompassed within the spirit and scope of the invention. Many of the features in one embodiment can be applied to other embodiments.

Although specific embodiments of the present invention will now be described with reference to the drawings it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope, and contemplation of the present invention as further defined in the appended claims.

Referring to FIGS. 1A through 4C, in general, the seal assembly 2 comprises two sections 10, 50, each section 10 and 50 being separate parts reversibly connectable to each other. The two sections 10, 50 are almost mirror images about a midline M, except for the differences discussed below. The first section 10 comprises a first flap seal 46 at a distal end 3 of the first section 10 (referred to as the "first distal end"), a first bulb snap-in member 12 at a proximal end 5 of the first section 10 (referred to as the "first proximal end") with a first bulb seal member 28 operatively connected to the first bulb snap-in member 12, and a first offset portion or junction 42 at a middle portion 4 (referred to as the "first middle portion") where the first bulb snap-in member 12 transitions or connects to the first flap seal 46 via a first flap seal retaining member 44. The first middle portion 4 also comprises a longitudinal mating shaft 48 perpendicular to the first flap seal retaining member 44 projecting from the first offset portion 42 to the midline M.

The second section 50 adjustably connects to the first section 10. The second section 50 comprises a second flap seal 46A at a distal end 3A of the second section 50 (referred to as the "second distal end"), a second bulb snap-in member 12A at a proximal end 5A of the second section 50 (referred to as the "second proximal end") with a second bulb seal member 28A operatively connected to the second section 50, and a second offset portion or junction 42A at a middle portion 4A of the second section 50 (referred to as the "second middle portion") where the second bulb snap-in member 12A transitions or connects to the second flap seal 46A via a second flap seal retaining member 44A. The second middle portion 4A comprises a shaft receiving member 50A protruding perpendicularly from the second flap seal retaining member 44A at the second offset portion 42A towards the midline M, the shaft receiving member 50A defining a longitudinal opening 56A through which the longitudinal mating shaft 48 is adjustably received to adjust a distance W between the first section 10 and the second section 50. Thus, the longitudinal mating shaft 48 and the shaft receiving member 50A form a bridge operatively connecting the first section 10 to the second section 50.

In some embodiments, the flap seals 46, 46A may be integrally formed with their respective bulb snap-in members 12, 12A as one piece units. In other embodiments, the flap seals 46, 46A may be reversibly connected to their respective bulb snap-in members 12, 12A. In embodiments in which the flap seals 46, 46A are reversibly connected to their respective bulb snap-in members 12, 12A, the bulb snap-in members 12, 12A may define a cavity or chamber into which the flap seals 46, 46A or the flap seal retaining members 44, 44A can be inserted. Alternatively, the flap seals 46, 46A or the flap seal retaining members 44, 44A may have the cavity and the bulb snap-in members 12, 12A may have a shaft section configured to be inserted into the cavities of the respective flap seals 46, 46A or flap seal retaining members 44, 44A.

Referring to FIGS. 1A-1C, in the preferred embodiment, the first section 10 comprises a first bulb seal member 28, a first bulb snap-in member 12 connected to the first bulb seal member 28, and a first flap seal 46 connected to the first bulb snap-in member 12.

At the proximal end 5 of the first section 10 is the first bulb seal member 28 and the first bulb snap-in member 12. The first bulb seal member 28 comprises a bulb seal 30 attached to a base member 40. In the preferred embodiment, the bulb seal 30 may be bent to form a semi-circular shape and connected to the base member 40 at its ends so as to form a generally "D"-shape configuration. However, any other shape can be used, such as any curved shape, contoured shape, circular shape, square shape, triangular shape, and the like. The base member 40 may be extruded plastic having a generally planar shape defined by a lateral wall side 32 and a proximal wall side 34 opposite the lateral wall side 32. In the preferred embodiment, protruding transversely from the proximal wall side 34 towards the midline M are a pair of cantilever snap members 36, 38 arranged bilaterally about the centerline C of the base member 40. Each cantilever snap member 36, 38 terminates into a transverse barrier section 35, 37. The transverse barrier sections 35, 37 are oppositely (outwardly) facing flanged portions at the free end tips of the cantilever snap members 36, 38. The cantilever snap members 36, 38 are configured to attach to the first bulb snap-in members 12 as discussed below.

The first bulb snap-in member 12 comprises a plastic extruded slot sidewall 14 and an oppositely disposed plastic extruded dart sidewall 16 having transverse walls 18, 20 perpendicular to the slot sidewall 14 and separating the slot sidewall 14 from the dart sidewall 16. The dart sidewall 16 has a pair of oppositely disposed retention walls 22, 24 extending perpendicularly from the transverse walls 18, 20, respectively, towards each other. The retention walls 22, 24 are coplanar but do not reach each other. Therefore, the retention walls 22, 24 define an opening 26 to receive the flexible cantilever snap members 36, 38 that projects from the extruded base member 40 of the first bulb seal member 28 so that the first bulb seal member 28 can be operatively connected to the first bulb snap-in member 12.

The cantilever snap members 36, 38 are configured to be flexibly pushed through the opening 26 defined by the retention walls 22, 24 (e.g. snap into the retention walls 22, 24) so that the respective cantilever snap members 36, 38 are press fit retained against the respective retention walls 22, 24. To facilitate the cantilever snap members 36, 38 being pushed or snapped through the opening 26, the transverse barrier sections 35, 37 each have a slanted outer surface 70, 72 allowing the flanged portions to taper back towards the centerline C of the bulb seal member 28. Similarly, the free ends of the transverse walls 22, 24 have a slant or taper 74, 76 (tapered towards the slot sidewall 14) matching their respective transverse barrier sections 35, 37. As the cantilever snap members 36, 38 are shoved into the dart sidewall 16, the respective tapered surfaces 70, 72 of the transverse barrier sections 35, 37 and the tapered free ends 74, 76 of the retention walls 22, 24 move past each other. This causes the cantilever snap members 36, 38 to be pressed towards the centerline C. Once the transverse barrier sections 35, 37 clear the retention walls 22, 24, the cantilever snap members 36, 38 snap back to its original configuration creating a biasing force against the free ends of the retention walls 22, 24. To that effect, the cantilever snap members 36, 38 may be bent slightly outwardly away from the centerline C in its natural state, rather than being perpendicular to the proximal wall side 34. In some embodiments, the length of the cantilever snap members 36, 38 may be slightly longer than the thickness of the retention walls 22, 24. This allows the cantilever snap members 36, 38 to have just enough clearance to get the transverse barrier sections 35, 37 passed the retention walls 22, 24 as the proximal side wall 34 of the base member 40 lays flush against the retention walls 22, 24. Due to the biasing force of the cantilever snap members 36, 38 against the retention walls 22, 24 a frictional force is created to hold the bulb seal member 28 in place and prevent any sliding action relative to the bulb snap-in member 12 without the need of any additional fasteners.

In any of the embodiments described herein, the cantilever snap members 36, 38 and the opening 26 may be reversed so that the cantilever snap members 36, 38 are on the dart sidewall 16 and the opening 26 is on the base member 40 of the bulb seal member 28.

Other fastening means can be used to retain the bulb seal member 28 on the dart sidewall 16 of the bulb snap-in member 12, such as snap fit-type fasteners, resistance fit-type fasteners, screw-type fasteners, adhesives-type fasteners and the like. In some embodiments, the first bulb seal member 28, and its extruded base member 40 and cantilever snap members 36, 38, is optional and the first section 10 can be operated without it.

At the first middle portion 4 of the first section 10 is the first offset portion or junction 42 where the first bulb snap-in member 12 is connected to the first flap seal 46. At the first offset portion 42, the first bulb snap-in member 12 merges into the first flap seal retaining member 44. Due to the offset 42, the slot sidewall 14 may not be coplanar with the first flap seal 46, but rather, the first flap seal 46 may be shifted medially relative to the slot sidewall 14. By way of example only, the first flap seal retaining member 44 may be made of TPO but is coextruded with the first flap seal 46 made of a TPE. The first flap seal 46 is essentially a flat, flexible, planar sheet of TPE projecting out from the first flap seal retaining member 44 away from the first bulb snap-in member 12. In any embodiment discussed herein, as shown in the embodiment in FIGS. 6A and 6B, the flap seal 646 may have a slight taper from the flap seal retaining member 644 towards the distal end 3. The tapering effect allows the flap seal 646 to have strength and durability at the point of connection to the flap seal retaining member 644 while maintaining flexibility at the distal end 3.

Figure 6A:
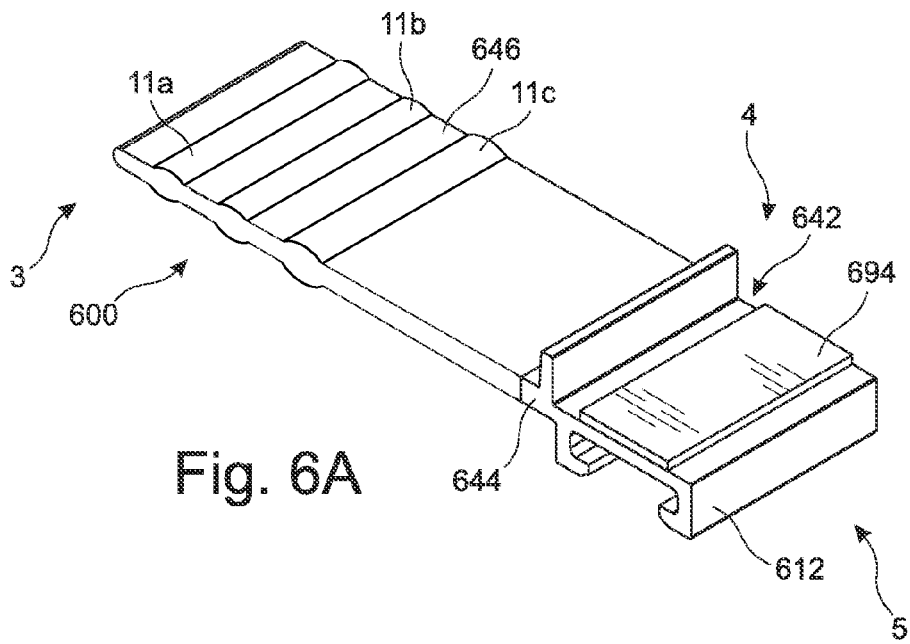
FIG. 6A shows a perspective view of an alternate embodiment of the seal assembly without a longitudinal mating shaft or shaft receiving member.
Figure 6B:
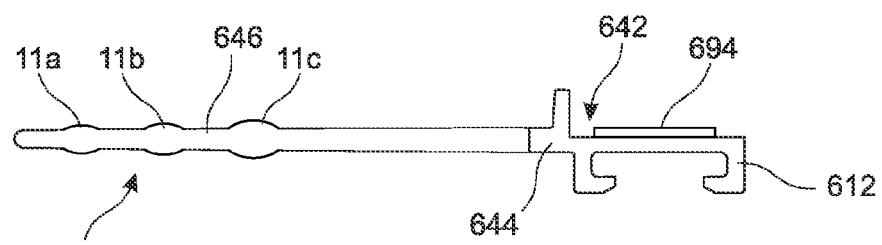
FIG. 6B shows a side view of the embodiment shown in FIG. 6A.

In any of the embodiments discussed herein, the flap seal 646 may have a protuberance 11a or bump protruding away from the surface of the flap seal 646 as shown in FIGS. 6A and 6B. The protuberance 11a may be on the dart side or on the slot side, or both.

In addition, there may be a plurality of protuberances 11a-c along the entire or partial length of the flap seal 646 arranged in rows. Preferably, each protuberance 11a-c extends the entire width of the flap seal 646 as shown in FIG. 6A. The single protuberance 11a can create a single point of contact to facilitate the seal. Multiple protuberances 11a-c can create multiple points of contact. Relative to a flap seal having a flat surface without any protuberances, the flap seal 646 with a single or multiple protuberances 11a-c reduces the surface area making contact with the RV expansion wall, thereby minimizing any interference the flap seal 646 may create in the movement of the expansion wall.

In addition, embodiments with multiple protuberances 11a-c, the protuberances 11a-c can be consistent in size (i.e. same size) or the sizes may vary. By way of example, only, as shown in FIGS. 6A and 6B, the protuberances 11a-c may get larger moving from the distal end 3 towards the proximal end 5. Having multiple protuberances decreases the total surface area of the flexible seal 646 relative to a flat seal without any protuberances that makes contact with the expansion room without compromising the seal formation. This becomes important as the expansion room slides in and out. By decreasing the area of contact, the flexible seal 646 is able to flex or move with the expansion room minimizing any interference with the flexible seal 646. In addition, with the protuberances 11a-c, the flexible seal can be made thinner, improving the flexibility without compromising the contact made with the expansion room.

Referring back to FIGS. 1A-1C, at the first middle portion, projecting from the first offset portion 42 is the longitudinal mating shaft 48. The longitudinal mating shaft 48 may be generally perpendicular to the flap seal retaining member 44 and extends from the offset portion 42 towards the midline M. In the preferred embodiment, the longitudinal mating shaft 48 terminates at a flanged base 82 that preferably tapers into an arrow tip 49 at its free end 80. The arrow tip 49 has a tapered point and a flanged base 82 that facilitates its insertion and retention as it mates with the shaft receiving member 50A of the second section as discussed below. However, other configurations of the free end 80 can also be used, such as a plain flanged head, a bulbous head, and the like.

The second section 50 is primarily a mirror image of the first section 10 about the midline M except that the longitudinal mating shaft 48 is replaced with a longitudinal mating shaft receiving member 50A to adjustably receive the longitudinal mating shaft 48 to facilitate adjusting a distance or width W between the two respective slot sections 10, 50. As such, like the first section 10, the second section 50 has a second distal end 3A, a second middle portion 4A, and a second proximal end 5A with a second bulb seal member 28A connected to the second bulb snap-in member 12A at the proximal end 5A, a second offset portion or junction 42A at the middle portion 4A, and a second flap seal 46A at the distal end 3A attached to the second offset portion 42A.

The second bulb seal member 28A comprises a second bulb seal 30A attached to a second base member 40A. In the preferred embodiment, the second bulb seal 30A is bent to form a semi-circular shape and connected to the second base member 40A at its ends so as to form a generally "D"-shape configuration. However, any other shape can be used, such as any curved shape, contoured shape, circular shape, square shape, triangular shape and the like. The second base member 40A is extruded plastic having a generally planar shape defined by a lateral wall side 32A (referred to as the "second lateral wall side") and a proximal wall side 34A (referred to as the "second proximal wall side") opposite the second lateral wall side 32A. In the preferred embodiment, protruding transversely from the proximal wall side 34A are a pair of cantilever snap members 36A, 38A (referred to as the "second cantilever snap members") arranged bilaterally about the centerline C of the second base member 40A. Each second cantilever snap member 36A, 38A terminates into a transverse barrier section 35A, 37A (referred to as "second transverse barrier sections"). The second transverse barrier sections 35A, 37A are oppositely (outwardly) facing flanged portions of the second cantilever snap members 36A, 38A.

Note, the second bulb seal 28A and its second extruded base member 40A and second cantilever snap members 36A, 38A are optional and the second section 50 can be operated without it.

The second bulb snap-in member 12A has a plastic extruded slot sidewall 14A (referred to as the "second slot sidewall") and an oppositely disposed plastic extruded dart sidewall 16A (referred to as the "second dart sidewall") having transverse walls 18A, 20A (referred to as "second transverse walls") separating the second slot sidewall 14A and the second dart sidewall 16A. The second dart sidewall 16A has a pair of oppositely disposed retention walls 22A, 24A (referred to as "second retention walls") extending perpendicularly from the transverse walls 18A, 20A. The retention walls 22A, 24A are coplanar and directed towards each other, but do not reach each other, thereby defining an opening 26A (referred to as the "second opening").

The second cantilever snap members 36A, 38A are configured to be flexibly pushed through or snap through the second opening 26A defined by the second retention walls 22A, 24A so that the respective second cantilever snap members 36A, 38A are press fit retained against the second dart sidewall 16A. To facilitate the second cantilever snap members 36A, 38A being pushed through the second opening 26A the second transverse barrier sections 35A, 37A each have a slanted outer surface 70A, 72A allowing the flanged portions to taper back towards the centerline C of the second bulb seal member 28A. Similarly, the free ends 74A, 76A of the second dart sidewalls 22A, 24A have a slant or taper (tapered towards the second slot sidewall 14A) matching their respective second transverse barrier sections 35A, 37A. As the second cantilever snap members 36A, 38A are shoved into the second dart sidewall 16A, the respective tapered surfaces 70A, 72A of the transverse barrier sections 35A, 37A and the tapered free ends 74A, 76A of the second retention walls 22A, 24A move past each other. This causes the second cantilever snap members 36A, 38A to be pressed towards the centerline C. Once the second transverse barrier sections 35A, 37A clear the second retention walls 22A, 24A, the second cantilever snap members 36A, 38A snap back to their original configuration creating a biasing force against the free ends of the second retention walls 22A, 24A. To that effect, the second cantilever snap members 36A, 38A may be bent slightly outwardly away from the centerline C, rather than being perpendicular to the second proximal wall side 34A. The length of the second cantilever snap members 36A, 38A may be slightly longer than the thickness of the second retention walls 22A, 24A to allow the second transverse barrier sections 35A, 37A of the second cantilever snap members 36A, 38A to have just enough clearance to get passed the second retention walls 22A, 24A as the second proximal side wall 34A at the second base member 40A lays flush against the second retention walls 22A, 24A.

At the second middle portion 4A, the second slot sidewall 14A extends to a second offset portion 42A which extends medially towards the midline M. The second slot sidewall 14A then transitions to the second flap seal retaining member 44A, which, by way of example only, may be made of TPO and may be coextruded with the second flap seal 46A, which may be made of TPE. From the second offset portion 42A the longitudinal mating shaft receiving member 50A projects perpendicularly from the second offset portion 42A with a pair of parallel spaced apart longitudinal walls, an exterior longitudinal wall 52A and an interior longitudinal wall 54A defining an interior longitudinal opening 56A. Each longitudinal wall 52A, 54A terminates in an interior retaining member 55A, 57A extending into the opening 56A. The interior retaining members 55A, 57A may each have an external taper 51, 53 at their free ends in the direction towards the flap seal retaining member 44A so as to match the taper of the arrow tip 49. This facilitates the arrow tip 49 of the longitudinal mating shaft 48 being snapped into the opening 56A. Once inserted into the opening, the flanged base 82 of the arrow tip 49 abuts against the interior retaining members 55A, 57A to prevent the longitudinal mating shaft 48 from being pulled out. The longitudinal mating shaft 48 is also able to slide within the longitudinal mating shaft receiving member 50A to adjust the width W of the slot 84.

Figure 9:
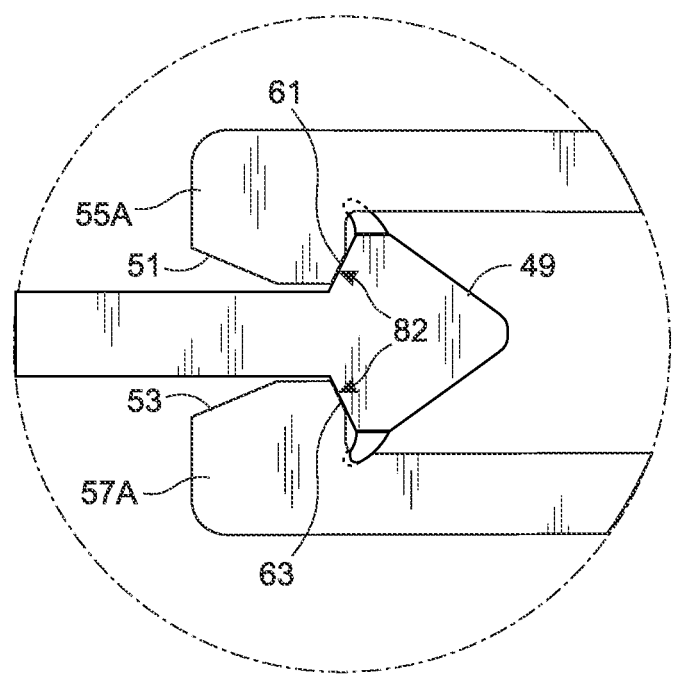
FIG. 9 shows a close-up of a variation of the connection between the longitudinal mating shaft and the longitudinal mating shaft receiving member, such as the area marked as 9 in FIG. 1B.

In any of the embodiments discussed herein, the free ends of the interior retaining members 55A, 57A also have internal tapers 61, 63. In such an embodiment, the flanged base 82 of the arrow tip 49 may also be reciprocally tapered so that the tapering of the flanged base 82 matches the internal tapers 61, 63 of the interior retaining members 55A, 57A as shown in FIG. 9. This facilitates the removal of the longitudinal mating shaft 48 from the longitudinal mating shaft receiving member 50A. When removing the longitudinal mating shaft 48 from the longitudinal mating shaft receiving member 50A eventually the tapered portion of the flanged base 82 comes into flush contact with the internal tapers 61, 63. Continual application of force allows the tapered portion of the flanged base 82 to move past the internal tapers 61, 63 causing the exterior retaining member 55A and the interior retaining member 57A to move away from each other as the arrow tip 49 snaps out of the longitudinal opening 56A. This allows the first section 10 to be removable from the second section 50 after assembly. In the event there is damage only to a single section 10 or 50, that section 10 or 50 can be removed without removing the other section for easy substitution or repair without having to discard the entire seal altogether.

Once the first section 10 and the second section 50 are assembled together, the first slot sidewall 14 on the first bulb snap-in member 12 and the second slot sidewall 14A on the second bulb snap-in member 12A in conjunction with the shaft receiving member 50A define a wall slot 84 into which a wall 502 of the RV 500 can be inserted as shown in FIGS. 5A-5C. The first offset portion 42, which extends transversely in a direction towards the midline M, merges into the first flap seal retaining member 44, thereby offsetting a plane defined by the first flap seal retaining member 44 relative to a plane defined by the first slot sidewall 14.

The first and second sections 10, 50 are positioned so that they face each other with the first slot sidewall 14 on the first section 10 parallel to and facing the second slot sidewall 14A on the second section 50, and with the respective bulb members 28, 28A facing away from each other. The longitudinal mating shaft 48 of the first section 10 is inserted into the opening 56A of the longitudinal mating shaft receiving member 50A of the second section 50 so that die arrow tip 49 is retained by the retaining members 55A and 57A of the walls 52A and 54A allowing the shaft 48 to slidably adjust within the longitudinal opening 56A. As a result, the distance or width W of the wall slot 84 between the oppositely disposed slot sidewalls 14 and 14A can be adjusted to accommodate the width of the wall section 502 of the recreational vehicle 500 or camper to which the bulb and flap assembly 2 is affixed. The pair of flap seals 46 and 46A extends parallel to each other.

The bulb seal members 28, 28A may come attached to the bulb snap-in members 12, 12A, respectively, or disassembled. If the bulb seal members 28, 28A are disassembled from their respective bulb snap-in members 12, 12A, to affix the seal assembly 2 to the wall 502 of a recreational vehicle 500, a fastening means such as one or more threaded screws 90 and 92 are pushed through the openings 26 and 26A in the dart walls 16 and 16A and respectively screwed through the respective slot sidewall 14, 14A and into the wall 502 of the recreational vehicle 500. Staples can also be used as the fastening members. At any time after the flap seals 46, 46A are affixed to the recreation vehicle 500, the bulb seal members 28, 28A may be snapped on to their respective bulb snap-in members 12, 12A. The distance between the slot sidewalls 14, 14A may be adjusted to match the thickness of the wall 502 so that there is a tight fit engagement between the two slot sidewalls 14, 14A and opposite sides of the exterior walls 502 of the vehicle 500 at the location where the expansion room (not shown) moves in and out. The flap seals 46, 46A extend into the open space in the recreational vehicle 500 through which the expansion room slidably moves. The first flap seal 46 is adjacent the outside of the recreational vehicle wall 502 and the second flap seal 46A is adjacent the inside of the recreational vehicle wall 502. When the expansion room is in the fully expanded condition, the second flap seal 46A and second bulb seal 30A provide the sealing function. When the expansion room is in the fully retracted position, the first flap seal 46 and first bulb seal 30 provide the sealing function. The first bulb seal 30 is adjacent the outside of the recreational vehicle wall and the second bulb seal 30A is adjacent the inside of the recreational vehicle wall.

Optional features include waterproof seals 94, 96 affixed to the respective slot sides 14, 14A. The seals 94, 96 are optional and either both or one seal can be used. The primary purpose is to be used as a waterproofing seal for the RV outer wall. The seals 94, 96 can also be used either in addition to screws or staples 90, 92 or in place of screws or staples 90, 92 to fasten a slot sidewall 14, 14A to a recreational vehicle sidewall 502 with adhesive. In the preferred embodiment, the seals 94, 96 may be made of acrylic foam tape.

Referring to FIGS. 2A-2E, the first alternative embodiment of the present invention is nearly identical to the first preferred embodiment with the only difference being that the flap seals are removably affixed to the first and second bulb snap-in members so that the flap seals can be replaced if they are damaged without the necessity of having to replace the entire seal assembly. Therefore, like the embodiment of FIGS. 1A-1C, the seal assembly 102 comprises first and second flexible seals 146, 146A, first and second offset portions or junctions 142, 142A connecting to the first and second flexible seals 146, 146A, respectively, first and second bulb snap-in members 112, 112A connected to the first acrd second offset portions 142, 142A, respectively, and first and second bulb seal members 128, 128A attachable to the first and second bulb snap-in members 112, 112A, respectively. Except as rioted below, the characteristics of the first and second flexible seals 146, 146A, first and second offset portions or junctions 142, 142A the first and second bulb snap-in members 112, 112A, and first and second bulb seal members 128, 128A, and their associated parts, are the same as that described for the embodiments in FIGS. 1A-1C.

With regards to the difference, the first slot side 114 extends to a first offset portion 142 which extends in the same direction as the slot side 114 but instead of terminating at the middle portion 4 in a rigid flap seal receiving member, it terminates in a transverse wall 115 which has a pair of oppositely disposed parallel sidewalk 119 and 121, one 119 of which is aligned or coplanar with the retention walls of the dart sidewall 116, and the opposite sidewall 121 spaced apart from the first sidewall 119. The free ends of the sidewalls 119, 121 have transverse walls 123, 127 extending toward each other, but leaving an opening 125 separating the transverse walls 123, 127, thereby defining a chamber 129 surrounded by the transverse walls 123, 127, the parallel walls 119, 121, and transverse wall 115.

By way of example only, the flap seal 146 may be supported by and coextruded with the flap seal retaining member 144. The flap seal retaining member 144 comprises a base wall 147 that extends away from the flap seal 146 and terminates opposite the flap seal 146 with a flanged portion in the form of a pair of hooked spring members 151, 153 separated by a partial split 152. The spring members 151, 153 are biased away from each other so as to be forced through the opening 125 between the pair of transverse walls 123, 127 and retained in the chamber 129. The spring members 151, 153 are tapered to facilitate insertion into the chamber 129. A press fit of the spring members 151, 153 against the interior of the transverse walls 123, 127 assures a tight fit within the chamber 129. A strong pulling force to overcome the spring fit is necessary to remove the spring members 151, 153, and replace the flap seals 146.

Similarly, the second section 100A the first slot side 114A extends to a first offset portion 142A which extends in the same direction as the slot side 114A but instead, of terminating at the middle portion 4A in a rigid flap seal receiving member, it terminates in a transverse wall 115A which has a pair of oppositely disposed parallel sidewalls 119A and 121A, one 119A of which is aligned or coplanar with a dart, sidewall 116A, and the opposite sidewall 121A spaced apart from the first sidewall 119A. The free ends of the sidewalls 119A, 121A have transverse walls 123A, 127A extending toward each other, but leaving an opening 125A separating the transverse walls 123A, 127A, thereby defining a chamber 129A surrounded by the transverse walls 123A, 127A, the parallel walls 119A, 121A, and transverse wall 115A.

By way of example only, the flap seal 146A may be supported by and coextruded with the flap seal retaining member 144A. The flap seal retaining member 144A comprises a base wall 147A that extends away from the flap seal 146A and terminates opposite the flap seal 146A with a flanged portion in the form of a pair of hooked spring members 151A, 153A separated by a partial split 152A. The spring members 151A, 153A are biased away from each other so as to be forced through the opening 125A between the pair of transverse walls 123A, 127A and retained in the chamber 129A. The spring members 151A, 153A are tapered to facilitate insertion into the chamber 129A. A press fit of the spring members 151A, 153A against the interior of the transverse walls 123A, 127A assures a tight fit within the chamber 129A. A strong pulling force to overcome the spring fit is necessary to remove the spring members 151A, 153A, and replace the flap seals 146A.

Figure 2D:
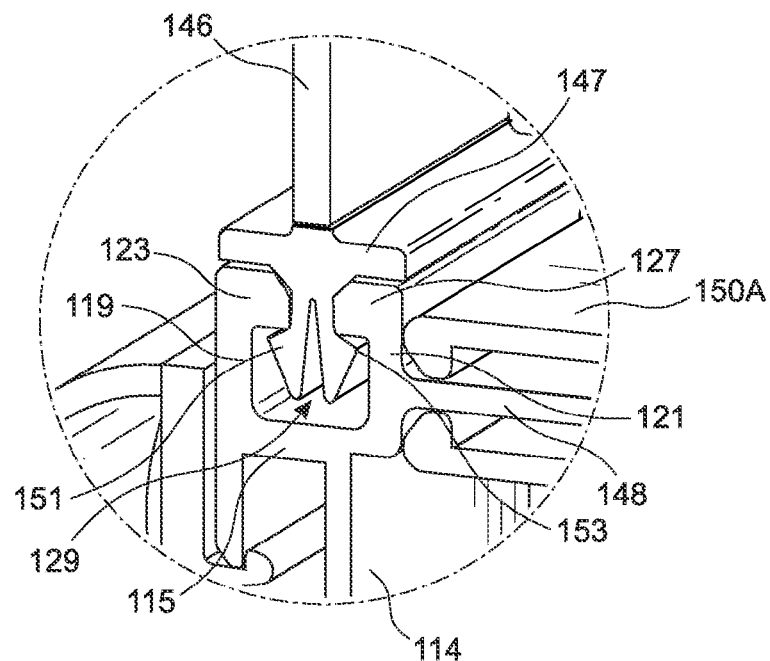
FIG. 2D is a close-up of the section marked 2D.
Figure 2E:
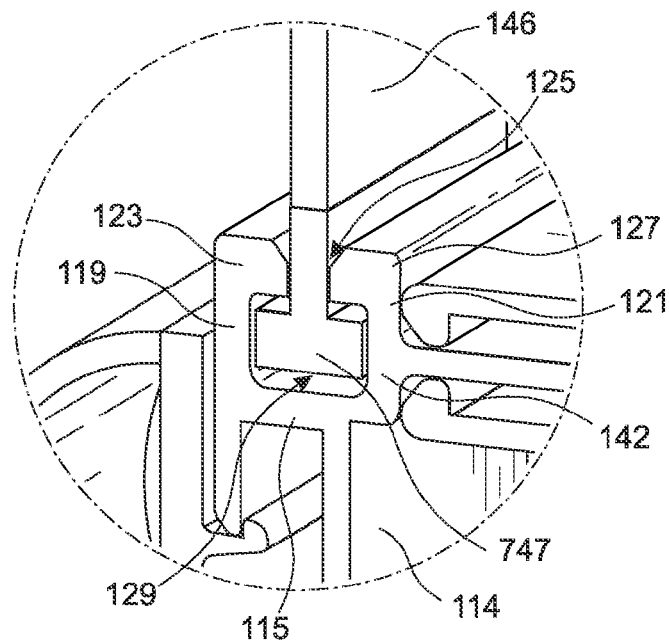
FIG. 2E is a close-up of the section marked 2D, with an alternative embodiment of the flap seal retention members.

In an alternative embodiment, as shown in FIG. 2E, instead of the flap seal retaining member having the hooked spring retainer 151, 153, the flap seal retaining member, which supports and may, in some examples, be coextruded with the flap seal 146 (only one side shown, but applicable to both sides), has an inverted T-shape to form a flanged portion, which is slidably fit within the cavity 129. The flap seal 146 may be supported by and coextruded with a base 147 having an inverted T-shaped member 747 which effectively fits within the chamber 129 to be retained by the retainer members 127, 123 in order to prevent the base and coextruded flap seal 146 from being removed from the chamber 129. The inverted T-shaped member 747 is slidably inserted into the cavity 129. In all other respects, the embodiment is the same as the embodiment as illustrated in the first alternative embodiment, the only difference being the flap seal 146 may be coextruded with the T-shaped member 747 retained in the cavity 129.

In this first alternative embodiment, the longitudinal mating shaft 148 terminating in an arrow tip 149 extends perpendicularly from the parallel sidewall 121 not in line with the dart sidewall 116 of the first section 100.

Optional features are waterproof seals 194, 196, such as acrylic foam tape, affixed to the respective slot sides 114, 114A. The seals 194, 196 are optional and either both or one seal can be used. The primary purpose is to be used as a waterproofing seal for the RV outer wall. The seals 194, 196 can also be used either in addition to screws 190, 192 or staples or in place of screws 190, 192 or staples to fasten a slot sidewall 114, 114A to a recreational vehicle sidewall 502 with adhesive.

Figure 3C:
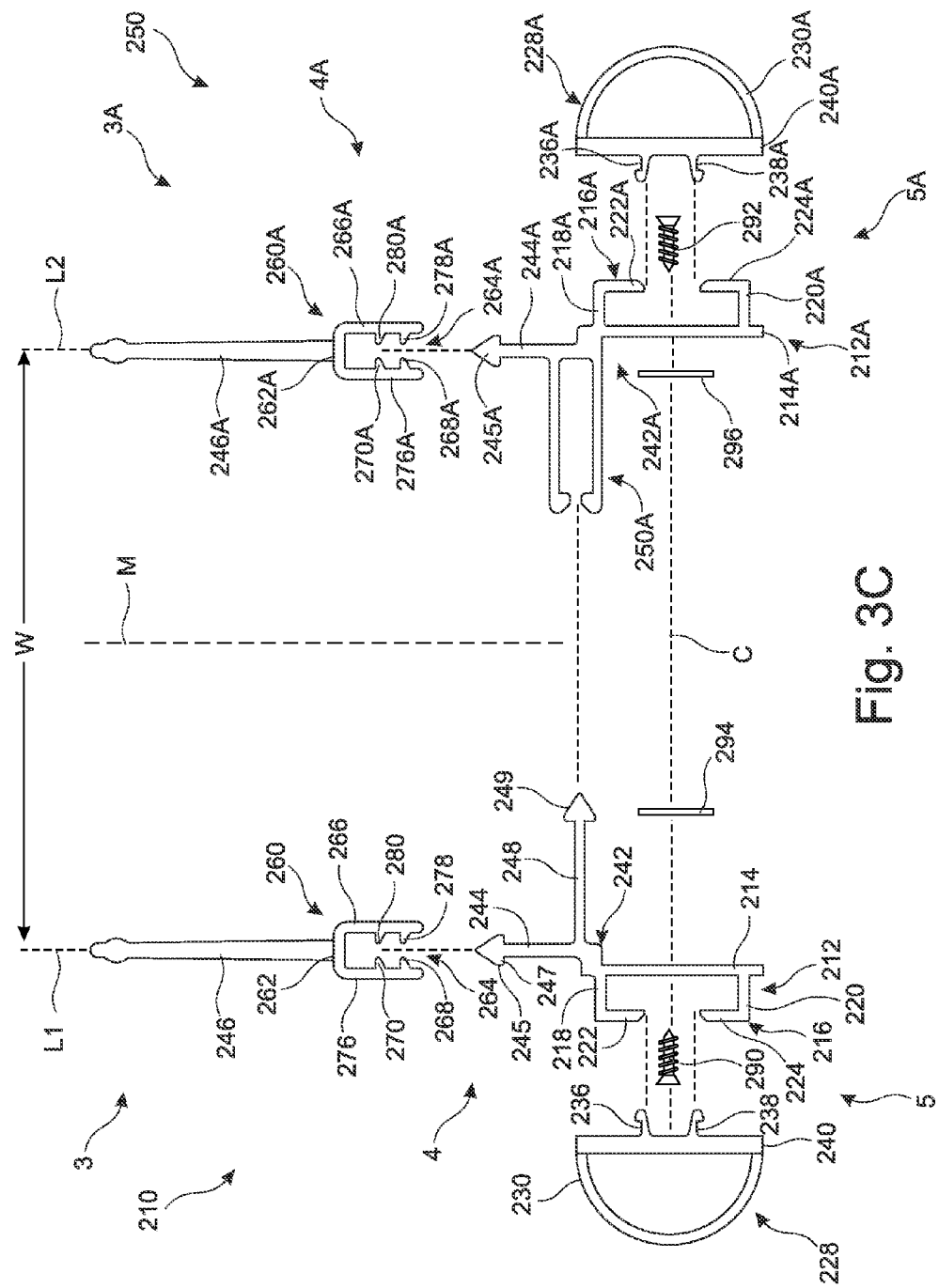
FIG. 3C is an exploded view of the embodiment shown in FIGS. 3A and 3B.

Referring to FIGS. 3A-3C, the second alternative embodiment of the present invention is nearly identical to the first preferred embodiment except for the structure to retain the flap seals, which in this variation, removably retains the flap seals but in a manner different from the first alternative embodiment wherein the flap seals are also removably retained. As such, the seal assembly 202 is a two section seal comprising flap seals 246, 246A at the distal ends 3, 3A, the offset portions or junctions 242, 242A at the middle portions 4, 4A, and bulb snap-in members 212, 212A connected to bulb seal members 228, 228A at the proximal ends 5, 5A. The characteristics of the bulb seal members 228, 228A and their associated parts, e.g. bulb seal 230, 230A, base members 240, 240A, cantilever snap members 236, 238 and 236A, 238A, etc.; and the characteristics of the bulb snap-in members 212, 212A and their associated parts, e.g. and the characteristics of the bulb snap-in members 212, 212A and their associated parts (e.g. slot sidewall 214, 214A; dart sidewall 216, 216A; transverse walls 218, 220, 218A, 220A; retention walls 222, 224, 222A, 224A; offset portion 242A, etc.) are the same as the previous embodiments.

In the first section 210, the first slot sidewall 214 extends from the proximal end 5 towards the middle portion 4 to a first offset portion 242. The first offset portion 242 deviates towards the midline M. From the first offset portion 242, a first shaft section 244 extends parallel to the first slot sidewall 214 towards the distal end 3, terminating in flanged head that preferably tapers into an arrow tip 245 at its free end. Due to the offset portion 242, the plane defined by the first shaft section 244 is not coplanar with the plane defined by the first slot sidewall 214. Rather, the first shaft section 244 is medial relative to the first slot sidewall 214. A longitudinal mating shaft 248 projects from the first offset portion 242 towards the midline M and perpendicular to the first shaft section 244. Like the previous embodiments, the longitudinal mating shaft 248 terminates at a flanged head or, preferably, an arrow tip 249.

By way of example only, the first flap seal 246 may be embedded in and coextruded with a flap seal retaining member or housing 260 having a transverse wall 262 and a pair of sidewalls 266, 276 extending therefrom towards the proximal end 5 to create an interior cavity 264 and a plurality of inwardly extending retainers 268, 270, 278, 280 extending into the cavity 264 from the sidewalls 266 and 276. The inwardly extending retainers 268, 270, 278, 280 may be slightly angled towards the distal end 3. In some embodiments, the inwardly extending retainers 268, 270, 278, 280 may have the appearance of a right triangle with the base formed from the sidewalls 266 or 276. In the preferred embodiment, two inwardly extending retainers 268, 270 protrude from one sidewall 276 and two inwardly extending retainers 278, 280 extend from the other sidewall 266 opposite the other two inwardly extending retainers 268, 270. In some embodiments, one pair of inwardly extending retainers 270, 280 on opposite sidewalls 276, 266 may be used.

The first shaft section 244 is retained in the cavity 264 due to the arrow tip 245 being press fit retained by the retainers 268, 270, 278, 280. A strong force is necessary to overcome the retention force to remove and replace the first flap seal 246. Due to a slanted proximal surface of the inwardly extending retainers 268, 270, 278, 280 and the tapered nature of the arrow tip 245, the first shaft section 244 can be easily inserted into the interior cavity 264; however, since the base 247 of the arrow tip 245 is engaged with the transverse distal surface of the retainer 268, 278, or 270, 280 when fully inserted, it becomes difficult to release the flap seal 246 from the first shaft section 244.

The second section 250 is substantially identical to the first section 210 with the exception that the second section 250 does not have the second shaft section 248, but rather the shaft receiving member 250A. As such, the second section 250 comprises a second bulb snap in member 212A merging into a second offset portion 242A at the middle portion 4A, a first shaft section 244A projecting from the second offset portion 242A towards the distal end 3A, and terminating in an arrow tip 245A. The second flap seal 246A may be embedded in and coextruded with a flap seal retaining member or housing 260A having a transverse wall 262A and a pair of sidewalls 266A and 276A extending therefrom to create an interior cavity 264A and a plurality of inwardly extending retainers 268A, 270A, 278A, 280A extending into the cavity 264A from the sidewalls 266A and 276A. The first shaft section 244A is retained in the cavity 264A with the arrow tip 245A press fit retained by the retainers 268A, 270A, 278A, 280A as discussed above for the first section 210. A strong force is necessary to overcome the retention force to remove and replace the second flap seal 246A. The second alternative embodiment otherwise functions the same as the first preferred embodiment.

Optional features illustrated in FIGS. 3A-3C are waterproof seals 294, 296, such as acrylic foam tape, affixed to the respective slot sidewalls 214, 214A. The seals 294, 296 are optional and either both or one seal can be used. The primary purpose is to be used as a waterproofing seal for the RV outer wall. The seals 294, 296 can also be used either in addition to screws 290, 292 or staples or in place of screws 290, 292 or staples to fasten a flap side to a recreational vehicle sidewall with adhesive.

Figure 4C:
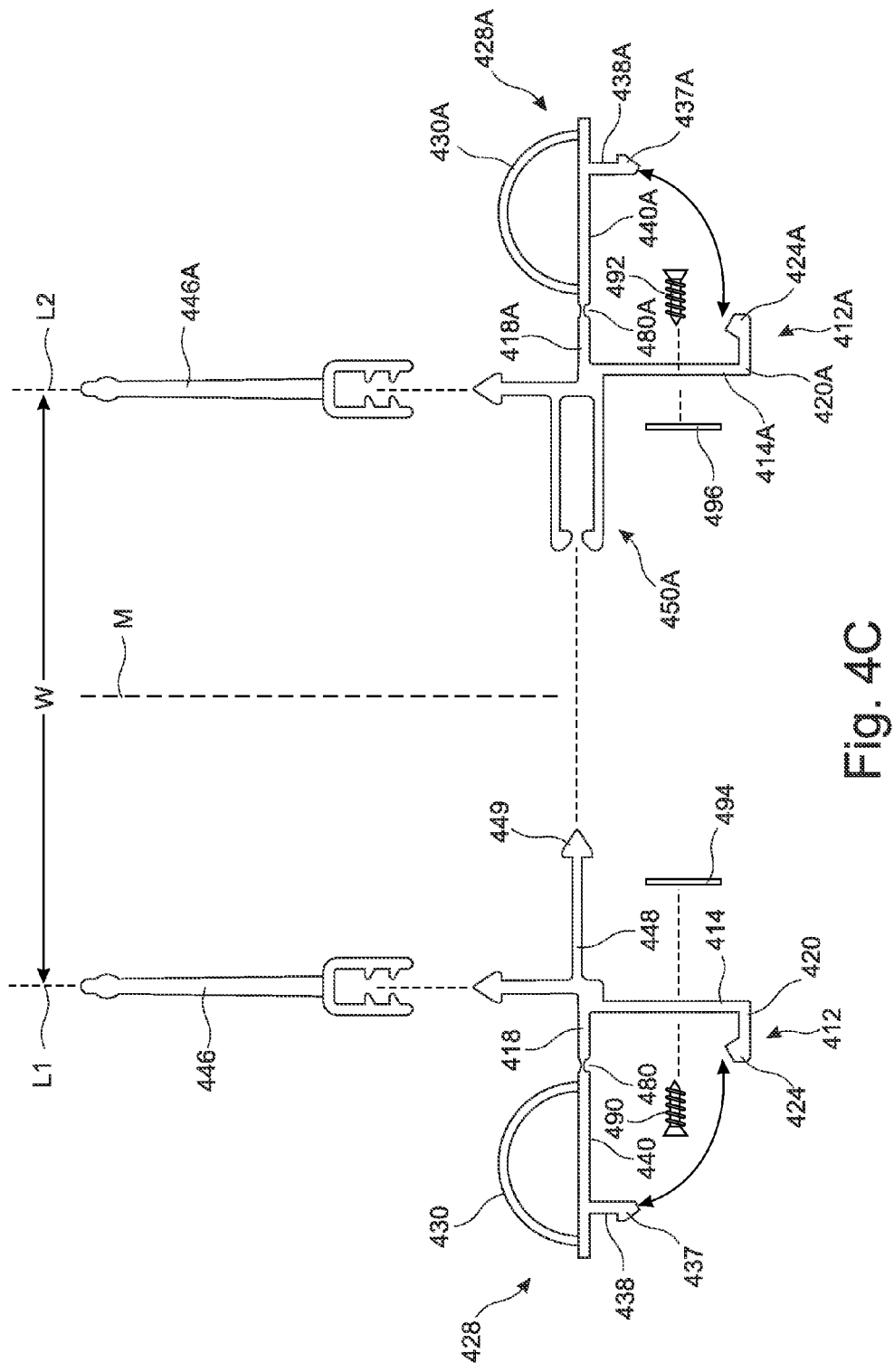
FIG. 4C is an exploded view of the embodiment shown in FIGS. 4A and 4B.

The third alternative embodiment illustrated in FIGS. 4A-4C can be incorporated into any of the previous embodiments. The main distinguishing feature is that the bulb seal members 428, 428A are attached to the bulb snap-in members 412, 412A, respectively by a living hinge 480 and 480A. By way of example only, FIGS. 4A-4C are shown with flap seals 446, 446A at the distal end 3, 3A that connect to the bulb snap-in members 412, 412A at the middle portion 4, 4A like that shown in FIGS. 3A-3C.

At the proximal end 5, the first bulb snap-in member 412 comprises a first slot sidewall 414 much like the previous embodiments. A first transverse wall 420 at the proximal end 5 projects perpendicularly from the first slot sidewall 414 away from the midline and terminates at a retention member 424. The first slot sidewall 414 further comprises a second transverse wall 418 opposite and parallel to the first transverse wall 420, the second transverse wall 418 projecting perpendicularly away from the midline M at the middle portion 4. The first bulb seal member 428 is similar to the bulb seal members discussed in previous embodiments except that this first bulb seal member 428 only has one cantilever snap member 438. Otherwise, the first bulb seal member 428 has the same base member 440, cantilever snap member 438 terminating at a transverse barrier section 437, and bulb seal 430 as the previous embodiments. A distinction; however, is that the base member 440 is connected to the second transverse wall 418 by a living hinge 480. This allows the bulb seal member 428 to remain attached to the bulb snap-in member 412 at all times while permitting the bulb seal member 428 from being released from the bulb snap-in member 412. Therefore, the bulb seal member 428 is only partially detachable from the bulb snap-in member 412. To attach the bulb seal member 428 to the bulb snap-in member 412, the bulb seal member 428 is pushed towards the bulb snap-in member 412 until the transverse barrier section 437 of the cantilever snap member 438 engages the retention member 424.

The second bulb snap-in member 412A has analogous parts, namely, a second slot sidewall 414A, a first transverse wall 420A at the proximal end 5 projecting perpendicularly from the second slot sidewall 414A away from the midline M and terminating at a second retention member 424A with a second transverse wall 418A opposite and parallel to the first transverse wall 420A, the second transverse wall 418A projecting perpendicularly away from the midline M at the middle portion 4. The second bulb seal member 428A is the same as the first bulb seal member 428 discussed above with the base member 440A, cantilever snap member 438A terminating at a transverse barrier section 437A, bulb seal 430A, and a living hinge 480A connecting the base member 440A to the second transverse wall 418A.

Optional features are waterproof seals 494, 496, such as acrylic foam tape, affixed to the respective slot sidewalls 414, 414A. The seals 494, 496 are optional and either both or one seal can be used. The primary purpose is to be used as a waterproofing seal for the RV outer wall. The seals 494, 496 can also be used either in addition to screws 490, 492 or staples or in place of screws 490, 492 or staples to fasten a slot side 414A to a recreational vehicle sidewall 502 with adhesive.

In any of the embodiments discussed herein, the seal assembly 600 may be used without the longitudinal mating shaft or the longitudinal mating shaft receiving member as shown in FIG. 6A-6B. Such an embodiment may comprise the flap seal 646 at a distal end 3, a bulb snap-in member 612 at a proximal end 5 and a flap seal retaining member 644 at the middle portion 4 connecting the bulb snap-in member 612 to the flap seal 646. The flap seal retaining member 644 may or may not have an offset portion 642. The bulb snap-in member 612 may have the waterproof seal 694. Two identical seal assemblies 600 can be used on opposite sides of the same wall for sealing both sides of the wall. The flap seal 646 may be removably attached to the bulb snap-in member 612 as discussed for the various embodiments above. Any of the bulb seal configurations can also be applied to the seal assembly 600, including the bulb seal member attached to the bulb snap-in member 612 by a living hinge.

Figure 7:
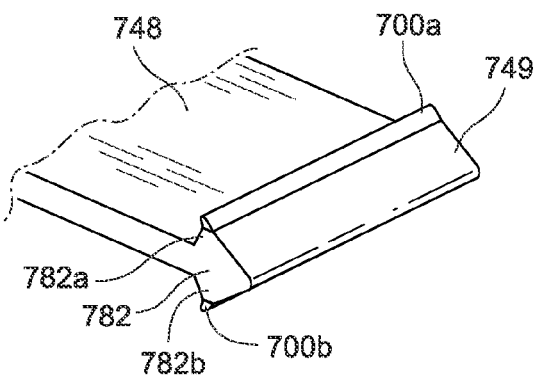
FIG. 7 shows a partial view of another embodiment of the longitudinal mating shaft.

In any of the embodiments discussed herein, additional features may be added to improve the seal produced by the seal assembly. For example, as shown in FIG. 7, the flanged base 782 of the longitudinal mating shaft 748 may comprise secondary seal members 700a, 700b at each of its flanged ends 782a, 782h. In the preferred embodiment, the distance from one secondary seal member 700a to the other secondary seal member 700h may be equal to or slightly greater than the distance between, for example, the inner surfaces of the exterior longitudinal wall 52A and the interior longitudinal wall 54A (i.e. the width of the opening 56A). In the preferred embodiment, the secondary seal members 700a, 700h will have greater flexibility than the arrow tip 749, specifically at the flanged ends 782a, 782h. The flexibility allows the secondary seal members 700a, 700b to flatten out as it is inserted into an opening (e.g. opening 56A). This allows the secondary seal members 700a, 700b to create a larger surface area of contact with the walls of a mating shaft receiving member (e.g. exterior longitudinal wall 52A and the interior longitudinal wall 54A), thereby improving the seal. Again, secondary seal members 700a, 700h can be applied to any of the longitudinal mating shafts 48, 148, 248, 448 described herein. In the preferred embodiment, the secondary seal member 700a, 700b may be made from TPE, but other like material, to prevent water from entering through the seal assembly can be used, such as other plastics, rubber, and the like.

Figure 8:
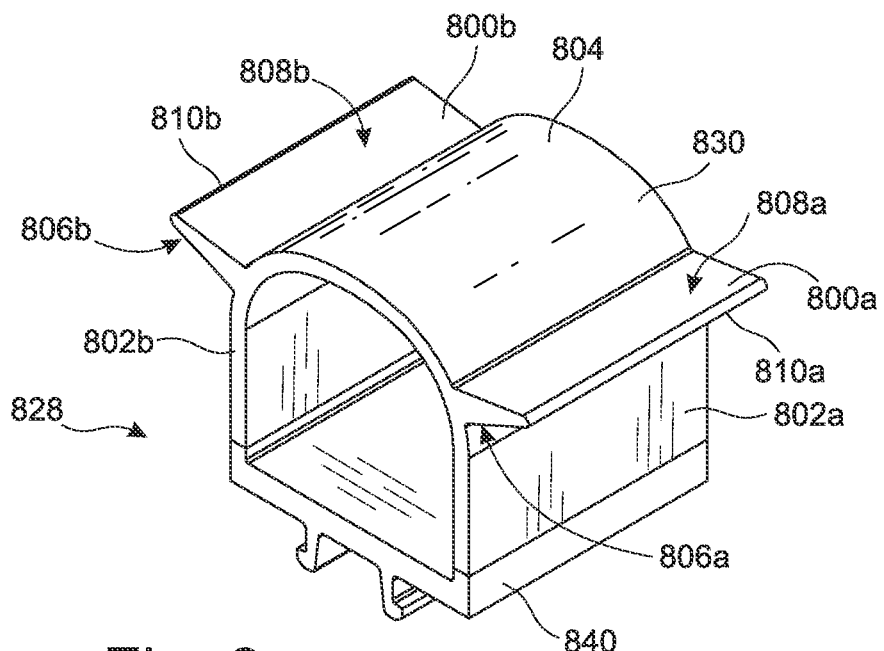
FIG. 8 shows another embodiment of the bulb seal.

Another feature that can be added to an of the embodiments discussed herein are bulb seal extensions or ears 800a, 800b protruding from the bulb seal 830 of the bulb seal member 828 as shown in FIG. 8. In the preferred embodiment, the bulb seal 830 has opposing parallel sidewalls 802a, 802h that are connected to the base member 840 in a perpendicular manner with the opposing parallel sidewalls 802a, 802b converging at a rounded apex 804 opposite the base member 840 so as to create the "D"-shape configuration, although other shaped configurations can also be used, such as curved shape, contoured shape, circular shape, square shape, triangular shape, and the like. The bulb seal extensions 800a, 800b may be placed approximately where the parallel sidewalls 802a, 802h transition into the rounded apex 804 as shown in FIG. 8. In the preferred embodiment, the bulb seal extensions 800a, 800b are generally triangular in shape with the base being integrally formed with the sidewalls 802a or 802b, respectively. The bulb seal extensions 800a, 800b each have a base side 806a, 806b facing the base member 840, and an apical side 808a, 808b. The base side 806a, 806b and the apical side 808a, 808b taper toward each other to a tip 810a, 810b. In the preferred embodiment, the tips 810a, 810b may be slightly angled towards the apex 804, but do not project passed the apex 804. In other words, the tips 810a, 810b are in between the apex 804 and the base member 840.

The base side 806a, 806b may form an angle of approximately 100 degrees to approximately 150 degrees with the respective sidewall 802a, 802b. Preferably, the angle created between the base side 806a, 806b and its respective sidewall 802a, 802b is approximately 110 degrees to approximately 135 degrees. More preferably the angle is approximately 110 degrees to approximately 120 degrees. In the preferred embodiment, the angle is 114 degrees. The angle formed at the tip 810a, 810b by the base side 806a, 806b and the apical side 808a, 808b, respectively may range from approximately 5 degrees to approximately 45 degrees. Preferably this angle ranges from approximately 10 degrees to approximately 25 degrees. In the preferred embodiment, this angle is approximately 15 degrees.

In such a configuration, as a wall is being moved towards the bulb seal member 828, the wall contacts the apex 804 first. Then as the wall continues to press into the bulb seal member 828, the wall contacts the bulb seal extensions 800a, 800b. Due to the depression on the apex 804, the bulb seal extensions 800a, 800b may even flex towards the wall creating an even tighter seal with the wall. In some embodiments, the bulb seal extensions 800a, 800b may simply be bumps protruding from the bulb seal, such as rounded bumps. Again, these features may be applied to any of the bulb seal members 28, 28A, 128, 128A, 228, 228A, 428, 428A, 1030, 1030A, 1130, 1130A.

FIG. 10A shows a variation of the embodiment shown in FIGS. 6A-6B incorporating a living hinge attachment for the bulb seal. Such an embodiment may comprise the flap seal 1046 at a distal end 3, a bulb snap-in member 1012 at a proximal end 5, and a flap seal retaining member 1044 at the middle portion 4 connecting the bulb snap-in member 1012 to the flap seal 1046. The flap seal retaining member 1044 can have an offset portion 1042. The bulb snap-in member 1012 may have the waterproof seal 1094.

In some embodiments, the flap seal 1046 may taper as it progresses towards the distal end 3. In some embodiments, the flap seal 1046 may have a protuberance 1011 projecting out from the flat surface of the seal.

The offset 1042 projects perpendicularly away from the middle portion 4 approximately at the transition region where the flap seal retaining member 1044 and the bulb snap-in member 1012 meet. The offset 1042 provides a ledge to properly position the seal 1000 on an RV wall. The offset 1042 is short enough such that when two seals 1000 are properly attached to an RV wall on opposite sides of the wall, a gap exists between the two opposing offsets 1042. Therefore, in the preferred embodiment, the offset 1042 is equal to or shorter than half the thickness of the RV wall to which the offset is attached.

Like the embodiment shown in FIGS. 4A-4C, the bulb seal member 1028 is attached to the bulb snap-in members 1012 by a living hinge 1080. At the proximal end 5, the bulb snap-in member 1012 comprises a first slot sidewall 1014 much like the previous embodiments. A first transverse wall 1020 at the middle portion 4 projects perpendicularly from the first slot sidewall 1014 opposite and away from the offset portion 1042, and terminates at a retention member 1024. In some embodiments, the retention member 1024 may be in the form of a "J"-hook. The slot sidewall 1014 further comprises a second transverse wall 1018 opposite and parallel to the first transverse wall 1020, the second transverse wall 1018 projecting perpendicularly away from the first slot sidewall 1014 at the distal end 5, in the same direction as the first transverse wall 1020. This arrangement of the transverse walls can be reversed. The bulb seal member 1028 is similar to the bulb seal members discussed in previous embodiments except that this bulb seal member 1028 only has one cantilever snap member 1038. Otherwise, the bulb seal member 1028 has the similar base member 1040, cantilever snap member 1038 terminating at a transverse barrier section 1037, and bulb seal 1030 as the previous embodiments. The transverse barrier section 1037 may be a "J"-hook. However a first end region 1060 of the base member 1040 is connected to the second transverse wall 1018 by a living hinge 1080. This allows the bulb seal member 1028 to remain attached to the bulb snap-in member 1012 at all times while permitting the bulb seal member 1028 to be partially released from the bulb snap-in member 1012. Therefore, the bulb seal member 1028 is only partially detachable from the bulb snap-in member 1012. To attach the bulb seal member 1028 to the bulb snap-in member 1012, the bulb seal member 1028 is pushed towards the bulb snap-in member 1012 until the transverse barrier section 1037 of the cantilever snap member 1038 at a second end region 1062 of the base member 1040 engages the retention member 1024.

Optional features are waterproof seals 1094, such as acrylic foam tape, affixed to the slot sidewall 1014. The seal 1094 is optional and either both or one seal can be used. The primary purpose is to be used as a waterproofing seal for the RV outer wall. The seals 1094 can also be used either in addition to a screw 1090 or staples or in place of the screw 1090 or staples to fasten the slot side 1014a to a recreational vehicle sidewall 502 with adhesive.

To strengthen the support of the base member 1040, a post 1100 may be provided extending from the base member 1040 towards the slot sidewall 1014 when the bulb seal member 1028 is in the closed configuration. The post 1100 is located at the first end region 1060 of the base member 1040 opposite the cantilever snap member 1038. The post 1100 has a length, such that when the bulb seal member 1028 is in the closed configuration the post 1100 abuts against, the slot sidewall 1014.

The base member 1040 may have a bump or contour 1102 in between the first end region 1060 and the second end region 1062 so that so that when the bulb seal member 1028 is closed, the base member 1040 leaves adequate space in between the bulb snap-in member 1012 and the base member 1040 to provide room for electrical wiring to be wired through the seal assembly. The contour 1102 allows the base member 1044 to flex while being snapped in. The transverse barrier 1037 and the retention wall 1024, each have a tapered surface 1070, 1074 to facilitate the cantilever snap member 1038 sliding past and locking with the retention wall 1024. In some embodiments, the transverse barrier 1037 and retention wall 1024 may have oppositely facing J-hook configurations.

The bulb seal 1030 may also have point contacts or nubs 1800 protruding at or around the apical region of the bulb (i.e. the curved region most distant from the base member 1040) to improve the seal when the extension room is in the opened or closed configuration. Each nub 1800 may be a short, stubby protrusion, and extends the entire length of the bulb seal (like the bulb extensions 800a, 800b shown in FIG. 8). The nubs 1800 are arranged in parallel rows, as each nub 1800 extends from one end of the seal to the opposite end of the seal, to assure that a complete seal is created along the entire length of the bulb seal. Therefore, each nub 1800 provides a point contact with the RV wall to create a seal. Should one nub 1800 provide an inadequate seal (for example, due to damage or debris), the other nubs 1800 provide a redundant seal. Additional internal flaps 1802 may project from the interior side of the slot sidewall 1014 to create additional seals against the RV wall when installed.

In use, one seal assembly 1000 may be attached to one side of the RV wall 502. If two seals are desired for a tighter seal, then two identical seal assemblies 1000 may be attached to opposite ends of the RV wall 502 in a mirror image configuration for sealing both sides of the wall. In some embodiments, the flap seal 1046 may be removably attached to the bulb snap-in member 1012 as discussed for the various embodiments above.

In some embodiments, as shown in FIG. 10B, two seal assemblies 1000, 1000A may be formed together as a single unit with the two seal assemblies 1000, 1000A arranged as mirror image and connected together by a bridge 1001. The bridge 1001 may simply be extensions of the two offset portions 1042 constructed as an integrally formed unit. Alternatively, the bridge 1001 may be adjustable by utilizing the longitudinal mating shaft and shaft receiving member configurations discussed in any of the embodiments disclosed herein. Thus, the second section 100A also comprises a flap seal 1046A at a distal end 3A, a bulb snap-in member 1012A at a proximal end 5A, and a flap seal retaining member 1044A at the middle portion 4A connecting the bulb snap-in member 1012A to the flap seal 1046A. The bulb snap-in member 1012 may have the waterproof seal 1094A and a screw 1090A or staple to fasten the bulb snap-in member 1012A to the wall. The dual flap seal embodiment also has a bulb seal 1028A assembly having a bulb seal 1030A attached to a base member 1040A with the base member attached to one of the transverse walls 1018A, 1020A of the second slot sidewall 1014A by a living hinge 1080A. The base member 1040A may have a cantilever snap member 1038A terminating at a transverse barrier section 1037A, a post 1100A, and contour 1102A. The bulb seal 1030A may have the bulb seal extensions 1800A at or near the apex of the bulb seal 1030A. The second slot sidewall 1014A may further comprise internal flaps 1802A to improve the seal with the RV wall.

In any of the embodiments discussed herein, various components or subcomponents of the seal assembly can be made of different material depending on the characteristics desired for each component using a coextrusion, tri-extrusion, or in general, a multi-extrusion process. For example, the flexible seal component can be made of one material, and the bulb snap-in member components can be made of a second material. Furthermore, within the bulb snap-in member, the slot sidewall subcomponent may be made of one material, and the transverse wall subcomponent and retention wall subcomponent may be made of a different material. Therefore, in this example, the flexible seal may be made of one material, the slot sidewall of the bulb snap-in member may be made of a second material, and the transverse and retention walls of the bulb snap-in member may be made of a third material.

By way of another example, the subcomponents of the bulb seal members may be made from one, two, three or more different material. In other words, the bulb seal may be made from one material, the base member may be made from a second material, and the cantilever snap members may be made of a third material.

In the preferred embodiment, the materials used may be various different types of plastic or rubber, such as thermoplastic olefin, thermoplastic elastomer, thermoplastic rubber, vulcanized rubber, and the like, or any combination thereof. The multi-material components and subcomponents may be created by a coextrusion, a tri-extrusion, or in general, a multi-extrusion process. By utilizing these multi-extrusion processes to make components and subcomponents of different material, the manufacturer can fine tune the seal assembly by utilizing the best type of material for the purpose intended for each component or subcomponent depending on the desired characteristics needed for those components or subcomponents, such as rigidity, flexibility, hardness, softness, and the like.

Insofar as the description above and the accompanying drawings disclose any additional subject matter that is not within the scope of the claims below, the inventions are not dedicated to the public and the right to file one or more applications to claim such additional inventions is reserved.

The invention can work with either one bulb and flap seal or two bulbs and flap seals. When working with only one bulb and flap seal, it is positioned on the outside of the trailer wall. When the room is in the extended condition, the flap seal will provide the sealing requirements. When the extended room is in the enclosed position, then the bulb seal will provide the sealing requirements. Therefore, the present invention can work with only one combination flap and bulb seal which is positioned on the outside wall of the camper or trailer. Alternatively, the invention can work with the second bulb and flap seal on the inside of the camper or trailer. Therefore, having the combination of two seals, when the recreation room is pressed back into the recreational vehicle, the exterior bulb seal and flap seal provide the sealing. When the extension room is removed and extended outwardly away from the recreational vehicle, the inward bulb seal and flap seal provide the sealing.

Of course the present invention is not intended to be restricted to any particular form or arrangement, or any specific embodiment, or any specific use, disclosed herein, since the same may be modified in various particulars or relations without departing from the spirit or scope of the claimed invention herein above shown and described of which the apparatus or method shown is intended only for illustration and disclosure of an operative embodiment and not to show all of the various forms or modifications in which this invention might be embodied or operated.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A seal assembly for use at an intersection of an expansion room and a wall of a recreational vehicle, comprising a first section, comprising:
   a. a first flap seal;
   b. a first flap seal retaining member connected to the first flap seal;
   c. a first bulb snap-in member connected to the first flap seal retaining member, the first bulb snap-in member defining a first slot sidewall and a first retention wall;
   d. a first bulb seal member, comprising:
      i. a first base member having a first end region and a second end region opposite the first end region, wherein the first end region is connected to the bulb snap-in member by a first living hinge, and wherein the second end region has a cantilever snap member terminating in a first transverse barrier section to reversibly connect to the first retention wall for a reversible snap-in connection; and ii. a first bulb seal attached to the base member; and e. a first offset protruding perpendicularly from the first slot sidewall opposite the first retention wall, wherein the first base member comprises a bend in between the first end region and the second end region, wherein the first bulb snap-in member comprises at least one internal flap opposite the first bulb seal, wherein the first bulb seal comprises a plurality of bulb seal extensions along an apical region of the bulb seal, wherein the first base member further comprises a post at the first end region configured to abut against the bulb snap-in member when in a closed configuration.

2. The seal assembly of claim 1, wherein the first flap seal is removably attached to the first flap seal retaining member.

3. The sealing assembly of claim 1, wherein the first flap seal is tapered.

4. The sealing assembly of claim 3, wherein the first flap seal comprises at least one protuberance at the distal end.

5. The sealing assembly of claim 2, wherein the first flap seal is tapered.

6. The sealing assembly of claim 5, wherein the first flap seal comprises at least one protuberance at the distal end.

7. A seal assembly for use at an intersection of an expansion room and a wall of a recreational vehicle, comprising:
 a. a first section, comprising:
  i. a first flap seal;
  ii. a first flap seal retaining member connected to the first flap seal;
  iii. a first bulb snap-in member connected to the first flap seal retaining member, the first bulb snap-in member defining a first slot sidewall and a first retention wall;
  iv. a first bulb seal member, comprising:
   1. a first base member having a first end region and a second end region opposite the first end region, wherein a first transverse barrier section at the second end region is reversibly connected to the first retention wall for a reversible snap-in connection; and
   2. a first bulb seal attachable to the first base member; and
 b. a second section connected to the first section, the second section comprising a second bulb snap-in member, the second bulb snap-in member defining a second slot sidewall and a second retention wall positioned parallel to the first bulb snap-in member, wherein the second section further comprises:
  i. a second base member attachable to the second retention wall; and
  ii. a second bulb seal attached to the second base member,
 c. wherein the first section is adjustably connected to the second section, the seal assembly comprising:
  i. a shaft receiving member protruding perpendicularly from the second bulb snap-in member, the shaft receiving member defining a longitudinal opening; and
  ii. a longitudinal mating shaft protruding perpendicularly from the first bulb snap-in member, wherein the longitudinal mating shaft is adjustably received by the shaft receiving member to adjust a distance between the first slot sidewall and the second slot sidewall,
 d. wherein the longitudinal mating shaft comprises an arrow tip and the shaft receiving member comprises a pair of interior retaining members projecting into the longitudinal opening, wherein the arrow tip and the pair of interior retaining members adjacent to each other when the first section and the second section are in a first configuration, and the arrow tip abuts against a second flap seal retaining member when the first section and the second section are in a second configuration,
 e. wherein the arrow tip comprises opposing secondary seal members that slidably contact the shaft receiving member to form a seal therewith.

8. The seal assembly of claim 7, wherein the first end region is attached to the first bulb snap-in member by a first living hinge.

9. The seal assembly of claim 8, wherein the first base member comprises a bend in between the first end region and the second end region.

10. The seal assembly of claim 9, wherein the first bulb snap-in member comprises at least one internal flap opposite the first bulb seal.

11. The seal assembly of claim 10, wherein the first bulb seal comprises a plurality of nubs along an apical region of the bulb seal.

12. The seal assembly of claim 11, wherein the first base member further comprises a post at the first end region configured to abut against the bulb snap-in member when in a closed configuration.

13. The sealing assembly of claim 12, wherein the first flap seal is tapered.

14. The sealing assembly of claim 13, wherein the first flap seal comprises at least one protuberance at the distal end.

15. The seal assembly of claim 7, wherein the first flap seal is removably attached to the first flap seal retaining member.

16. The seal assembly of claim 15, further comprising a plurality of flap seals and a plurality of flap seal retention members, each flap seal removably connected to one of the flap seal retention members.

17. The sealing assembly of claim 7, wherein each of the pair of interior retaining members comprises an internal taper, and wherein the arrow tip comprises a tapered flanged base to mate with the internal tapers to facilitate removal of the longitudinal mating shaft from the shaft receiving member.

* * * * *

UNITED STATES PATENT AND TRADEMARK OFFICE
CERTIFICATE OF CORRECTION

| | | |
|---|---|---|
| PATENT NO. | : 8,701,351 B2 | Page 1 of 1 |
| APPLICATION NO. | : 13/975198 | |
| DATED | : April 22, 2014 | |
| INVENTOR(S) | : Kenneth Siegel | |

It is certified that error appears in the above-identified patent and that said Letters Patent is hereby corrected as shown below:

Title page, item [71]
The Applicant,
"Kenneth Siegel"

Should be changed to:

--Trim-Lok, Inc.--

Signed and Sealed this
Thirteenth Day of January, 2015

Michelle K. Lee
*Deputy Director of the United States Patent and Trademark Office*